(12) United States Patent
Sabbouh

(10) Patent No.: US 8,640,087 B2
(45) Date of Patent: Jan. 28, 2014

(54) SEMANTIC SYSTEM FOR INTEGRATING SOFTWARE COMPONENTS

(75) Inventor: Marwan Sabbouh, Chelmsford, MA (US)

(73) Assignee: The MITRE Corporation, McLean, VA (US)

( * ) Notice: Subject to any disclaimer, the term of this patent is extended or adjusted under 35 U.S.C. 154(b) by 1503 days.

(21) Appl. No.: 12/000,096

(22) Filed: Dec. 7, 2007

(65) Prior Publication Data

US 2008/0168420 A1    Jul. 10, 2008

Related U.S. Application Data

(63) Continuation-in-part of application No. 11/377,459, filed on Mar. 17, 2006, now Pat. No. 7,823,123.

(60) Provisional application No. 60/873,248, filed on Dec. 7, 2006, provisional application No. 60/900,312, filed on Feb. 9, 2007.

(51) Int. Cl.
   *G06F 9/44*        (2006.01)

(52) U.S. Cl.
   USPC .......................................................... 717/106

(58) Field of Classification Search
   USPC .......................................................... 717/106
   See application file for complete search history.

(56) References Cited

U.S. PATENT DOCUMENTS

2003/0163450 A1*  8/2003  Borenstein et al. ............... 707/1
2005/0091386 A1*  4/2005  Kuno et al. .................... 709/228

OTHER PUBLICATIONS

Monica Crubezy et al., "Mediating Knowledge between Application Components", 2003.*

* cited by examiner

*Primary Examiner* — Wei Zhen
*Assistant Examiner* — Lanny Ung
(74) *Attorney, Agent, or Firm* — Sterne Kessler Goldstein & Fox PLLC

(57) ABSTRACT

A method and a scripting paradigm for automatically integrating disparate information systems (e.g., web services and databases) within a given enterprise into a service-oriented architecture. A script writer generates a script using a scripting paradigm, and the resulting script automatically derives new data models, new ontological structures, new mappings, and a new web service that integrates disparate information systems. In addition to integrating disparate information systems, the scripts may be harvested to automate the metadata discovery and retrieval process. The scripting paradigm builds upon existing open-source scripting languages and is compatible with existing internet browsers, thus encouraging mass participation in the integration process.

16 Claims, 36 Drawing Sheets

TECHNICAL ARCHITECTURE

Input=Instance in AM domain; Output=Class in AO domain
Child-Concepts= method-process-instance ("COORD: 21 N 20678076 5423265", Output, 1);

method-process-instance (Input-Instance, Output, FLAG)
{
Child-Parent-Concept= NULL;
 X= Get Full Def of (Output);    C(i)= All-Triples (X);

if (C(i) != NULL)
   {
      For each i in C(i)
      {
         o(i)= Object-value ( C(i) );
         r(i)= Relation (C(i));
         if (r(i) == hasMatchingValue)
         {
                Value-instance(n)= DPQ( Input-instance, o(i) )
                  Return Value-instance( );
         }
        else if (r(i) == hasMatch || sameAs )
        {
                Value-instance(n)= DPQ(Input-instance, o(i) ) Exclude links:
                 hasMatch, hasInput , hasOutput, hasContext, and isTheContextOf
                Child(n)= IIQ(value-instance(n), Output)
                Return Child ();
        }
         else if {r(i) == hasContext || isTheContextOf || isAgentOutputOf || isOutputOf)           { do
         nothing;}
         else {
                Child()=method-process-instance ( o(i), 0 );
                If ( FLAG== 0 )
                {
                        For each j in Child(j){
                           if( Child(j) != Null){
                                if (Child-Parent-concept(j)==NULL){
                                        Child-Parent-concept(j)= New KN
                                                Assert Child-Parent-concept(j) subClassOf
                                                Concept
                                }
                                Assert Child (j)   subClassOf      o(i)
                                Assert Child-Parent-concept(j) r(i)   Child(j);

}
                }
                Else
                {
                        For each j in Child(j){
                                if( Child(j) != Null){
                                        if (Child-Parent-concept(0)==NULL){
                                        Child-Parent-concept(0)= New KN
                                        Assert Child-Parent-concept(0) subClassOf   Concept
                                        }
                                        Assert Child (j)   subClassOf   o(i)
                                        Assert Child-Parent-concept(0) r(i)   Child(j);
                                }
                        }
                }
            }
            i = i+1;
         }// end for each i
   }// end c(i)!= Null
Return Child-Parent-concept ();
}// end method

FIG. 24

```
<head>
    <title>Marwan</title>
    <script language="JavaScript" src="semantic.js" ></script>
</head>
<body>
    <script language="JavaScript">

//import SWSL files
load(http://mitre.org/mafcaf.swsl)

//import Context
use ("http://semanticweb.mitre.org/contextontologies/time-ontology.owl");
use ("http://semanticweb.mitre.org/contextontologies/position-ontology.owl");

//import WSDL files
load ("http://www.mitre.org/maf.wsdl");
load ("http://www.mitre.org/caf.wsdl");

//align concepts
matchingValue ("maf-callsign", "caf-callsign");
matchingValue ("maf-eventStartTime", "caf-eventTime");
matchingValue ("maf-taskUnit", "caf-TaskUnit");
match ("maf-AircraftType", "caf-AircraftType" );
match ("maf-eventType", "caf-eventType");
owl::sameAs ("maf-AircraftType", "caf-AircraftType", "caf-AircraftType", "A10A","AO10A" );
owl::sameAs ("maf-AircraftType", "caf-AircraftType", "MAF-B052H", "CAF-B52");
owl::sameAs ("maf-AircraftType", "caf-AircraftType", "MAF-F015", "CAF-F15C");
owl::sameAs ("maf-eventType", "caf-eventType","Landing", "ARR");
owl::sameAs ("maf-eventType", "caf-eventType", "TakeOff", "DEP");
hasContext("maf-coord", "UTM");
hasContext("caf-coord", "Geodetic");

//orchestrate workflow
step ("maf-service", "maf-mission-key", "maf-mission");

//Invoke mediator to reconcile syntactic, structural, and representational mismatches
mediate ("maf-mission", "caf-mission");

// At this stage, the resulting information system ontologies and their mappings are automatically
//generated and the workflows are automated or orchestrated.

</script>
</body>
```

FIG. 30

```html
<html>

<head profile="http://mitre.org/wmsl/profile">
<title>Marwan</title>
<base href=" http://mitre.org/wmsl/"/>

<!—Import ontologies -->

<link rel="schema.owl" type="text/html" href="http://www.w3.org/2002/07/owl#" />
<link rel="schema.rdfs" type="text/html" href="http://www.w3.org/2000/01/rdf-schema#"/>

<link rel="schema.MAF" type="application/rdf+xml" href="http://mitre.org/owl/1.1/maf#" />
<link rel="schema.CAF" type="application/rdf+xml" href="http:/mitre.org/owl/1.1/caf#"/>
<link rel="schema.position" type="application/rdf+xml" href="http://mitre.org/owl/1.1/position#"/>
<link rel="schema.time " type="application/rdf+xml" href="http://www.mitre.org/ontology/1.1/time#"/>
<link rel="schema.map" type="application/rdf+xml" href=" http://www.mitre.org/mappings/1.1/mappings#"/>

<!—An alternative to importing ontology: Import schemas or wsdl -->

<link rel="schema.MAF" type="text/xml" href="http://www.mitre.org/xsd/1.1/maf#"/>
<link rel="schema.CAF" type="text/xml" href=" http://www.mitre.org/xsd/1.1/caf#"/>

<!—Import wmsl hybrids -->

<link rel="schema.CAF" type="text/wsml" href=" http://www.mitre.org/mashup1#" /><body>

</head>
<body>

<!--align concepts-->

<dl class="owl-equivalentClass">
<dt><a href="http://mitre.org/owl/1.1/maf#maf-callsign"> </a></dt>
<dd><a href="http://mitre.org/owl/1.1/caf#caf-callsign"> </a> </dd>
 <dt><a href="http://mitre.org/owl/1.1/maf#maf-eventStartTime"> </a> </dt>
<dd><a href="http://mitre.org/owl/1.1/caf#caf-eventTime"> </a> </dd>h
 <dt><a href="http://mitre.org/owl/1.1/maf#maf-taskUnit"> </a> </dt>
<dd><a href="http://mitre.org/owl/1.1/caf#caf-taskUnit"> </a> </dd>
</dl>

<!-- initialize scripting language -->
<script language="JavaScript">

<!-- orchestrate workflows -->
        step ("maf-service", "maf-mission-key", "maf-mission");

<!-- invoke mediator to reconcile syntactic, structural, and representational mismatches -->
        mediate ("maf-mission", "caf-mission");

<!-- at this stage, the resulting information system ontologies and their mappings are
<!-- automatically generated and the workflows are automated or orchestrated.-->

</script>

</body>
</html>
```

FIG. 31

```html
<dl class="owl-sameAs">
    <dt><a href="http://mitre.org/owl/1.1/maf#MAF-B052H"> </a></dt>
    <dd><a href="http://mitre.org/owl/1.1/caf#CAF-B52"> </a></dd>
    <dt><a href="http://mitre.org/owl/1.1/maf#A10A"> </a></dt>
    <dd><a href="http://mitre.org/owl/1.1/caf#A010A"> </a></dd>
    <dt><a href="http://mitre.org/owl/1.1/maf#MAF-F015"> </a></dt>
    <dd><a href="http://mitre.org/owl/1.1/caf#CAF-F15C"> </a> </dd>
    <dt><a href="http://mitre.org/owl/1.1/maf#landing"> </a> </dd>
    <dd><a href="http://mitre.org/owl/1.1/caf#ARR"> </a> </dd>
    <dt><a href="http://mitre.org/owl/1.1/maf#TAKEOFF"> </a></dt>
    <dd><a href="http://mitre.org/owl/1.1/caf#DEP"></a> </dd>
</dl>
```

FIG. 32 (a)

```html
<dl class="mappings-match">
    <dt><a href="http://mitre.org/owl/1.1/maf#maf-AircraftType"> </a></dt>
    <dd><a href="http://mitre.org/owl/1.1/caf#caf-AircraftType"> </a> </dd>
    <dt><a href="http://mitre.org/owl/1.1/maf#maf-eventType"> </a></dt>
    <dd><a href="http://mitre.org/owl/1.1/caf#caf-eventType"> </a> </dd>
    <dt><a href="http://mitre.org/owl/1.1/maf#maf-coord"> </a></dt>
    <dd><a href="http://mitre.org/owl/1.1/caf#caf-coord"> </a> </dd>
</dl>
```

FIG. 32 (b)

```html
<dl class="mappings-hasContext">
    <dt><a href="http://mitre.org/owl/1.1/caf#caf-coord"> </a></dt>
    <dd><a href="http://mitre.org/owl/1.1/position#Coord-GEODETIC-WGE"> </a> </dd>
    <dt><a href="http://mitre.org/owl/1.1/maf#maf-coord"> </a> </dt>
    <dd><a href="http://mitre.org/owl/1.1/position#coord-UTM-WGE"> </a></dd>
</dl>
```

FIG. 32 (c)

```
<dl class="mappings-hasRelation">
    <dt><a href="http://mitre.org/owl/1.1/position#coord-UTM-WGE"> </a> </dt>
    <dd><a href="http://mitre.org/owl/1.1/position#WGE"> </a> </dd>
    <dt><a href="http://mitre.org/owl/1.1/position#coord-GEODETIC-WGE"> </a></dt>
    <dd><a href="http://mitre.org/owl/1.1/position#WGE"> </a> </dd>
</dl>
```

FIG. 32 (d)

```
<dl class="rdfs-subclassOf">
    <dt><a href="http://mitre.org/owl/1.1/maf#maf-AircraftType"> </a></dt>
    <dd><a href="http://mitre.org/owl/1.1/maf#MAF-B052H"> </a> </dd>
    <dt><a href="http://mitre.org/owl/1.1/maf#maf-AircraftType > </a></dt>
    <dd><a href="http://mitre.org/owl/1.1/maf#MAF-F015"> </a> </dd>
    <dt><a href="http://mitre.org/owl/1.1/caf#caf-AircraftType"> </a></dt>
    <dd><a href="http://mitre.org/owl/1.1/caf#CAF-B052H"> </a> </dd>
    <dt><a href="http://mitre.org/owl/1.1/caf#caf-AircraftType"> </a></dt>
    <dd><a href="http://mitre.org/owl/1.1/caf#CAF-F015"> </a> </dd>
    <dt><a href="http://mitre.org/owl/1.1/maf#maf-eventType"> </a></dt>
    <dd><a href="http://mitre.org/owl/1.1/maf#landing"> </a> </dd>
    <dt><a href="http://mitre.org/owl/1.1/maf#maf-eventType"> </a></dt>
    <dd><a href="http://mitre.org/owl/1.1/maf#TAKEOFF"> </a> </dd>
    <dt><a href="http://mitre.org/owl/1.1/caf#caf-eventType"> </a></dt>
    <dd><a href="http://mitre.org/owl/1.1/caf#ARR"> </a> </dd>
    <dt><a href="http://mitre.org/owl/1.1/caf#caf-eventType"> </a></dt>
    <dd><a href="http://mitre.org/owl/1.1/caf#DEP"> </a> </dd>
    <dt> <a href="http://mitre.org/owl/1.1/position#UTMCoord"> </a></dt>
    <dd><a href="http://mitre.org/owl/1.1/position#coord-UTM-WGE"> </a></dd>
    <dt><a href="http://mitre.org/owl/1.1/position#GeodeticCoord"> </a> </dt>
    <dd><a href="http://mitre.org/owl/1.1/position#Coord-GEODETIC-WGE"> </a> </dd>
</dl>
```

FIG. 32 (e)

SEMANTIC SYSTEM FOR INTEGRATING SOFTWARE COMPONENTS

CROSS-REFERENCE TO RELATED APPLICATIONS

The present application is a continuation-in-part of pending U.S. patent application Ser. No. 11/377,459, filed on Mar. 17, 2006, which is hereby incorporated by reference in its entirely, and claims priority to U.S. Provisional Patent Application No. 60/873,248, filed on Dec. 7, 2006, and to U.S. Provisional Patent Application No. 60/900,312, filed on Feb. 9, 2007, which are both incorporated herein by reference in their entireties.

STATEMENT REGARDING FEDERALLY-SPONSORED RESEARCH AND DEVELOPMENT

The U.S. government has a paid-up license in this invention and the right in limited circumstances to require the patent owner to license others on reasonable terms as provided for by the terms of Contract No. FA8721-07-C-0001 awarded by the United States Air Force.

BACKGROUND OF THE INVENTION

1. Field of the Invention

The present invention relates to a system for integrating software components using a semantic ontology management system. The present invention further relates to a system for integrating disparate, information systems into a service-oriented architecture to provide data interoperability across an enterprise.

2. Background Art

Web service standards are enjoying widespread adoption in corporations across many industries. Corporations are recognizing the value of making it easier for other applications to consume their data by using web standards such as the Hyper Text Transfer Protocol (HTTP), web addressing, and Extensible Markup Language (XML). Using these standards, software clients written in one programming language can access and retrieve information from a server, irrespective of the technology (e.g., hardware, operating system, and programming language) that the server uses.

However, even with the adoption of these web standards, problems remain. For example, although XML is mature as a syntax for web data exchange, current XML technologies do not supply the capabilities provided by more mature technologies like relational database systems. Also, while solutions that aid in web service discovery (e.g., Universal Description, Discovery and Integration (UDDI), as described at http://www.uddi.org/specification.html, incorporated by reference herein) and invocation (e.g., Web Services Description Language (WSDL), as described at http://www.w3.org/2002/ws/desc, incorporated by reference herein) are emerging, they are far from mature. Similarly, technologies that reason with web service description files for the purpose of chaining web services are not available. It is left to the programmer to determine, at design time, which web services to invoke, the order in which they need to be invoked, and the formatting of information necessary to complete an operation. As a result, the programmer writes much of the "glue code" necessary for a particular computation. A need still exists for methods and systems that allow automatic generation of such "glue code," as well as automatic discovery and integration of available web services and data repositories.

Further, large enterprises are moving towards a service-oriented architecture strategy to make data repositories and web services from one part of the enterprise available for use in another part. However, these service-oriented architectures often fail to address the semantics of individual information systems. The representation of position on a particular information system may lack a reference datum, and hence, position data one information system may not be easily accessed and utilized by other information systems. Another example of such a semantic mismatch is the representation of time on an individual information system, which may lack the essential designation of a time zone. The failure of service-oriented architectures to recognize and address data semantics and semantic mismatches leads not only to execution errors, but also to lengthy testing and integration cycles that find and correct the resulting errors (see Herrera, X., "The bottom line for accurate massed fires: common grid," *Field Artillery Journal*, pg. 5-9, January-February 2003, which is incorporated herein by reference).

Existing web service standards are unable to address fully the issues facing modern enterprises during the integration of disparate information systems. Common semantic markup languages (e.g., OWL-S: Semantic Markup Language for Web Services, as described at http://www.w3.org/Submission/OWL-S, incorporated herein by reference) are not sufficiently broad to offer a solution, and existing semantic frameworks (e.g., Web Service Modeling Ontology (WSMO), as described at http://www.w3.org/Submission/WSMO, incorporated herein by reference) are not sufficiently general to address the integration needs imposed by emerging behavior. Further, existing sets of OWL/RDF mappings are likewise insufficiently broad to address the changing needs of the integration process (e.g., Crubezy, et al., "Mediating knowledge between application components", Semantic Integration Workshop of the Second International Semantic Web Conference (ISWC-03), Sanibel Island, Fla., CEUR, 82.2003, incorporated herein by reference). It is left to the programmer at the time of integration to determine the semantic and contextual mismatches that exist between data representations on multiple information systems, resolve these mismatches, and generate the code that integrates the various information systems across the enterprise. Thus, a need exists for methods and systems to automatically integrate the disparate information systems into a service-oriented architecture that provides data interoperability across the enterprise.

The issues that modern enterprises face while integrating disparate information systems are often exacerbated by an ongoing transition of the internet from a collection of isolated information sources to an accessible network of highly interactive content and rich user interfaces. On the back end, this transition is fueled by the ability of data management systems to instantaneously change database models and to support the automated migration of data instances to updated data models. On the front end, open-source scripting languages are enjoying a renaissance on the web, and the open-source creation of content is a key driver of successful companies.

Further, large corporate and governments enterprises, such as the Department of Defense, are increasingly challenged by the requirements of "netcentricity," which mandates that stored information be accessible, understandable, and interoperable across an enterprise. Unlike the internet, where data exists in unstructured, text documents, a large portion of the data within the Department of Defense is highly structured and is stored within databases. As such, search engines that depend upon searching text documents, such as Google, often fail within database-reliant enterprises. Thus, the capabilities to index and search metadata are virtually missing within the Department of Defense enterprise, and contractors are often required to work closely with communities-of-interest to provide data interoperability between structured databases on a case-by-case basis.

SUMMARY OF THE INVENTION

Accordingly, the present disclosure introduces methods and computer-program products for integrating data across multiple information systems.

According to various embodiments of the disclosed processes, a first set of mapping relations is developed to map entities in a source structured data model to corresponding entities in a target structured data model. A second set of mapping relations is also developed to map entities in the source structured data model and entities in the target structured data model to one or more shared contexts. The first and second sets of mapping relations are subsequently processed to generate a new structured data model. Executable code is generated to publish the new structured data model to implement workflow between the source information system and the destination information system. In an embodiment, the code executes source information to retrieve an instance, translates the source instance into an instance that conforms to the new structured data model, and subsequently invokes a destination service to further populate the instance conforming to the new structured data model. In an additional embodiment, services are invoked that corresponding to the shared context to mediate mismatches between entities in the source structured data model and entities in the target structured data model.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein

BRIEF DESCRIPTION OF THE FIGURES

The present invention is described with reference to the accompanying drawings. The accompanying drawings, which are incorporated herein and form a part of the specification, illustrate embodiments of the present invention and, together with the description, further serve to explain the principles of the invention and to enable a person skilled in the relevant art to make and use the invention.

FIG. 24 is an example algorithm which creates a new data instance on the AO information system domain and links that data instance to corresponding AM data.

FIG. 30 is an exemplary SWSL script that automatically implements data models and ontological structures necessary to integrate disparate information systems.

FIG. 31 is a second exemplary SWSL script that automatically implements the integration of web services, and can generate the data models and ontological structures necessary to integrate disparate information systems.

FIGS. 32(a) through 32(e) are exemplary portions of an alignment block that may be incorporated within the exemplary SWSL script of FIG. 31.

Figure 1:
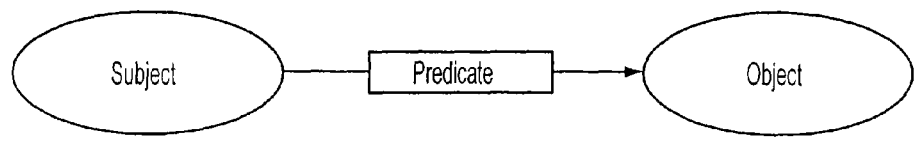
FIG. 1 is a generic "triple" showing the relationship conveyed in graphs shown in this document.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

Definitions

As used herein, a "web service" is an application program (for example, a program implemented in Java or PHP on the World Wide Web) that accepts defined input(s) and returns defined output(s), and that exposes its interface, for example using Web Services Definition Language (WSDL). Example web services include the map servers found at MapQuest™ and Yahoo! Maps™, online telephone directories such as Switchboard.com™, and online weather services such as Weather.com™ and the National Weather Service site at http://www.nws.noaa.gov/. While the web services discussed in the specification are available on the World Wide Web, the term "web service" is also intended to include services accessible only on internal intranets (such as an employee "facebook" or directory) or on standalone computers (such as an XML front end to a database or application program).

As used herein, a "database" or "structured data repository" is a collection of data having a formalism (i.e., structured data). Databases may be organized into "tables" of "records" having "fields" as is conventional in the art (see, e.g., *Webster's New World Dictionary of Computer Terms*, 4$^{th}$ ed., Prentice Hall, New York, 1992), or may be more loosely structured (e.g., a structured text file or a tagged file format document).

As used herein, a "triple" or "RDF triple" is a statement that conveys information about a resource, and that can be represented as a subject, a predicate, and an object. As depicted herein, a triple is graphically represented as shown in FIG. 1, wherein subject and object nodes are connected by a directional line representing the predicate. An example statement that could be represented as a triple might be "the book *Moby Dick* (subject) has an author (predicate) whose value is Herman Melville (object)." Subject, predicate, and object can all be identified by uniform resource identifiers (URIs), such as a uniform resource locator (URL). Predicates are generally properties of resources, while subjects and objects may be described as "concepts."

As used herein, an "ontology graph" or simply a "graph" is a collection of related triples that together convey information about the relationships between the concepts represented by the nodes of the graph (the set of objects and subjects of the statements represented by the triples).

As used herein, an "ontology" or "domain ontology" is a dictionary of terms within a given domain of knowledge, formulated in a known syntax and with commonly accepted definitions, including relationships between the terms (e.g., in the form of triples or an ontology graph).

Semantic Web Technologies

Today, Semantic Web technologies are beginning to emerge with promises of enabling a much faster integration of applications and data (see, e.g., Gruber, "A Translation Approach to Portable Ontologies," *J. Knowledge Acquisition*, 5(2):199-200, 1993; Guarino, et al., "Ontologies and Knowledge Bases: *Towards a Terminological Clarification*," in *Towards Very Large Knowledge Bases Knowledge Building and Knowledge Sharing*, N. Mars, ed., IOS Press, Amsterdam, 1995; Berners-Lee, et al., "The Semantic Web," *Scientific American*, May 2001; and Daconta, et al., *The Semantic Web: A Guide to the Future of XML, Web Services, and Knowledge Management*, Wiley US, July 2003, all of which are incorporated by reference herein). However, for that to happen, Semantic Web technologies must facilitate access to large amounts of data with minimal programmer intervention. Web services must be discovered, chained, and invoked automatically, thus relieving the programmer from having to do these steps. Semantic Web standards provide a rich framework for the precise description of data and applications, thereby enabling greater automation in this end-to-end web service execution process. The World Wide Web Consortium (W3C) proposed recommendation for a standard web ontology language (OWL), as described at http://www.w3.org/TR/2004/REC-owl-features-20040210/(incorporated by reference herein), builds on web technologies including XML's ability to define customized tagging schemes and RDF's flexible approach to representing data.

Convergence between web services and Semantic Web technologies is beginning, as illustrated by the OWL-Services (OWL-S) effort (see http://www.daml.org/services/owl-s/1.0/and pages linked therein, which are incorporated herein by reference). OWL-S is an effort to develop a web service ontology that could be used to describe the properties and capabilities of web services in unambiguous, computer-interpretable form.

According to the invention, such Semantic Web technologies can be used to discover execution paths spanning the retrieval of data from structured data repositories and execution of web services, to automate the integration of data repositories and web services, and to automatically generate the "glue code" needed to achieve the integration. The example described below shows how a marriage of web services and Semantic Web technologies can further automate this integration process. OWL-S represents a partial solution that can be used according to the invention to orchestrate web services. The example also illustrates how databases can be mapped into ontologies according to the invention, thus making their data available to web services.

An information system will need the capability to integrate new and existing services, e.g., application programs or web services, and incorporate additional information resources, e.g., relational databases or XML documents. In most cases application programs and web services require access to information contained within a data source. Very often the challenge for IS systems is to integrate existing data sources with application programs or web services. The use of IS ontologies and an ontology management system according to the invention can enable this type of integration by generating the integration code automatically.

The existing OWL-S web service ontology model provides features for invoking and accessing web services. However OWL-S does not address the need for web service integration and interaction with an existing database without first building a web service that abstracts the database. The invention provides a methodology to enable the integration of new web services with existing databases.

By representing databases and web services in ontology space and by linking them to the domain ontology, we can now integrate with existing databases, and other web services, without developing additional code. Using IS ontologies in this way not only results in code being generated, but also eliminates the need for creating a web service ontology with composite processes comprised of control flow constructs as defined in OWL-S.

The same Semantic Web technologies that integrate databases and web services into a single ontological structure may also be used to provide interoperability between the numerous information systems within modern enterprises. Typically, communities of interest (COI) within an enterprise develop information models with shared semantics and consistent representations of associated data and web services. In an effort to address emerging behavior, these large enterprises are moving towards a service-oriented architecture strategy that provides data and web service interoperability between the various communities of interest within the enterprise.

Building on the semantic framework described above, the invention uses Semantic Web technologies to integrate disparate information systems into a service-oriented architecture using OWL/RDF ontologies as well as OWL/RDF mapping relations. Individual information system domain ontologies still represent information system data models. However, our approach is no longer dependent on building domain ontologies in the Gruber sense. Ontological characterizations of the individual community-of-interest data and web service (WS) models are introduced to facilitate data interoperability across the enterprise. Further, the invention leverages ubiquitous enterprise concepts like Position, Time and Types of Things (What, When and Where) and builds a context ontology for each that relates all the various representations across the enterprise. The example described below illustrates how context ontologies can integrate the disparate information system ontologies across a large enterprise into a single structure providing data interoperability to each community of interest.

Although the concepts of Position, Time and Types of Things are ubiquitous across the enterprise, each concept may have a different representation within each community of interest or information system. By using OWL/RDF mappings to relate information system domain ontologies to context ontologies, we are able to resolve such representational differences. Additional OWL/RDF mappings between information system ontologies resolve structural and syntactic mismatches between individual concepts. Further OWL/RDF mappings associate web services with ontologies in a fashion identical to that used when integrating web services into ontological structures within a single information system. The invention provides a methodology to automate the interoperability of disparate information systems by reasoning over the set of information system ontologies, the context ontologies, and their associated OWL/RDF mappings. The reasoning process results in workflow discovery, automatic web service invocation, and reconciliation of mismatches.

The invention is described below with reference to particular examples such as integrating a database with a web service, and "chaining" multiple web services. However, those of ordinary skill in the art will readily see that the inventive techniques may be used in a variety of ways, including rapidly integrating pluralities of legacy databases and/or web services into new systems without a need for extensive programming, and selecting appropriate web services from within an ontology without a need for user familiarity with the available web services. Further, the invention may be used not only with an "ontology viewer" to process individual user queries, but may also be used to construct custom Information System (IS):web/database services that access underlying databases and web services as needed to process queries.

The invention is further described by additional examples, such as the integration of multiple, disparate information systems using a number of context ontologies and a translator web service. Those of ordinary skill in the art will readily see that the inventive techniques may be used in a variety of ways, including the rapid integration of both additional information systems and additional context ontologies into an existing semantic framework without a need for extensive programming. Further, the invention may be easily generalized to return a number of potential output workflows corresponding to a specified given plurality of input data instances on a number of information systems.

Example 1

Integrating Databases and/or Web Services into a Searchable Ontological Structure The following example shows how an address database and a map-finding web service (e.g., the map services available at MapQuest™ and Yahoo!™) may be integrated according to the invention, by performing the following steps:

Provide a domain ontology

Create and link a database component ontology to the domain ontology

Create and link a web service component ontology to the domain ontology

Broker a user request to suggest executable paths

Figure 2:
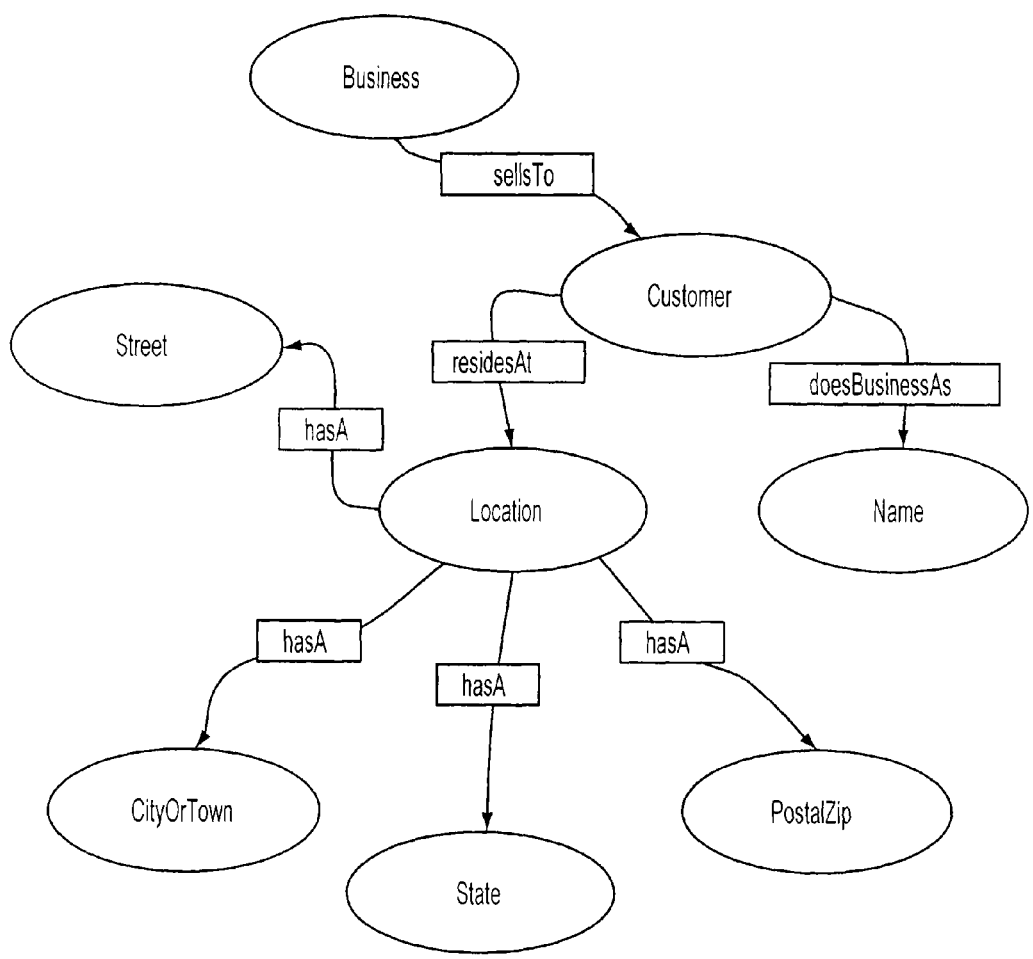
FIG. 2 is a domain ontology for an address domain.

Manually view the result of implementing one of the executable paths through the augmented ontology or automatically generate a web service to do so The domain ontology, D, includes the RDF classes Business, Customer, Name, Location, Street, CityOrTown, State, and PostalZIP. D is represented as a uniform structure of triples, {subject, relationship, object}, as shown in Table 1. This ontology may also be represented graphically, as shown in FIG. 2. (Note that the domain ontology may include other classes and relationships; for simplicity, only seven triples from the ontology are shown).

TABLE 1

D:: {Business, sellsTo, Customer}
D:: {Customer, doesBusinessAs, Name}
D:: {Customer, residesAt, Location}
D:: {Location, hasA, Street}
D:: {Location, hasA, CityOrTown}
D:: {Location, hasA, State}
D:: {Location, hasA, PostalZIP} sellsTo, doesBusinessAs, and residesAt are OWL object properties, and hasA is an OWL datatype property with domain rdf:Class and range datatype string. As shown, this domain ontology is manually created, typically by experts in the business domain to which it pertains. It may be possible to automatically create useful domain ontologies using artificial intelligence techniques or other methods; such ontologies may also be used according to the invention.

A database ontology R is then constructed for linking to the domain ontology D to form an augmented ontology $D^+$. R is the conjunction of a database upper ontology $R^U$ specifying the structure, algebra, and constraints of the database, and a database lower ontology $R^L$ including the data as instances of $R^U$, as follows.

The upper ontology $R^U$ specifies the structure, algebra and constraints of any relational databases in RDF/OWL triples. We define the RDF classes Database, Relation, Attribute, PrimaryKey and ForeignKey. A portion of $R_U$ is given in Table 2:

TABLE 2

$R^U$::{Database, hasRelation, Relation}
$R^U$::{Relation, hasAttribute, Attribute }
$R^U$::{PrimaryKey, subClassOf, Attribute }
$R^U$::{ForeignKey, subClassOf, Attribute } where hasRelation and hasAttribute are OWL object properties, and subClassOf is defined in the RDF schema (available at http://www.w3.org/TR/rdf-schema/).

Consider a database having a table ADDRESS as depicted in Table 3. (For brevity, only two of the data records are shown). The relation ADDRESS has Address_ID as the primary key, and Name, Street, City, State, and Zip as attributes. The portion of $R^L$ corresponding to this table may then be constructed (in part) as shown in Table 4.

TABLE 3

| Address_ID | Name | Street | City | State | Zip |
|---|---|---|---|---|---|
| 001 | The MITRE Corporation | 202 Burlington Road | Bedford | MA | 01730 |
| 002 | XYC, Inc. | 255 North Road | Chelmsford | MA | 01824 |

TABLE 4

$R^L$::{Address, isInstanceOf, Relation}
$R^L$::{Address, hasAttribute, Address_ID}
$R^L$::{Address, hasAttribute, Street}
$R^L$::{Address, hasAttribute, Name}
$R^L$::{Address, hasAttribute, Zip}
$R^L$::{Name, isInstanceOf, Attribute }
$R^L$::{Street, isInstanceOf, Attribute }
$R^L$::{Zip, isInstanceOf, Attribute }
$R^L$::{Address_ID, isInstanceOf, PrimaryKey }

Figure 3:
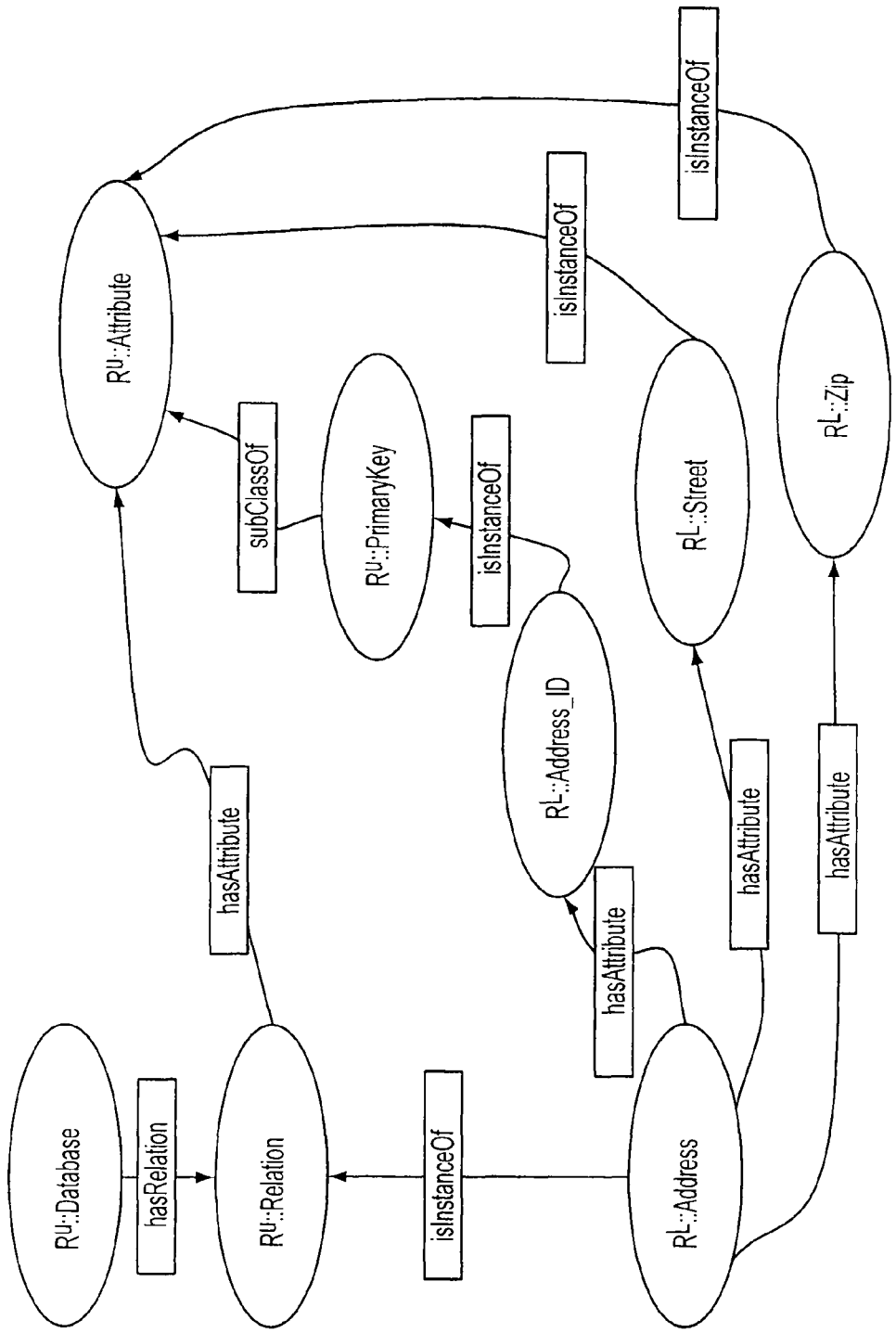
FIG. 3 is a partial ontology for an address database.

R is then the conjunction of $R^U$ and $R^L$ as partially shown in FIG. 3 (Note that the fields "City" and "State" have not been shown in R for the sake of brevity, but are linked to the concepts "CityOrTown" and "State" in D in a manner analogous to that shown for "Street" and "Zip" below). If there are entity relationships not captured in the R, these may be inserted manually at this stage.

The concepts in database ontology R are then mapped to the concepts in the domain ontology D to create an augmented domain ontology $D^+$. In this example, this is done using the relationship hasSource, as shown in Table 5. (Note that the linked concepts need not have identical names, as in the mapping between D::PostalZIP and R::Zip).

TABLE 5

$D^+$::{D::Name, hasSource, R::Name}
$D^+$::{D::Street, hasSource, R::Street}
$D^+$::{D::PostalZIP, hasSource, R::Zip}

Figure 4:
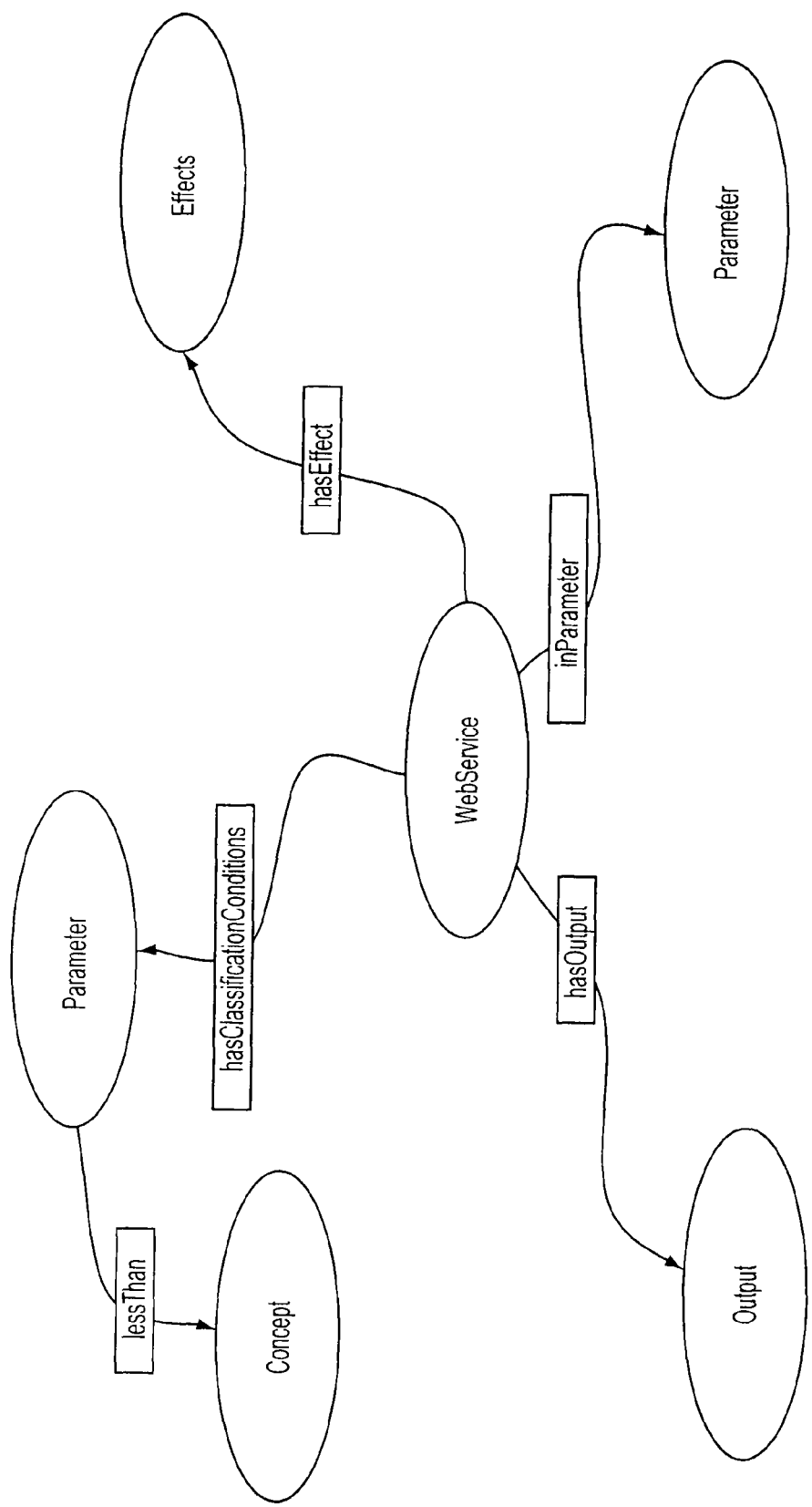
FIG. 4 is a generic upper ontology for a web service.
Figure 5:
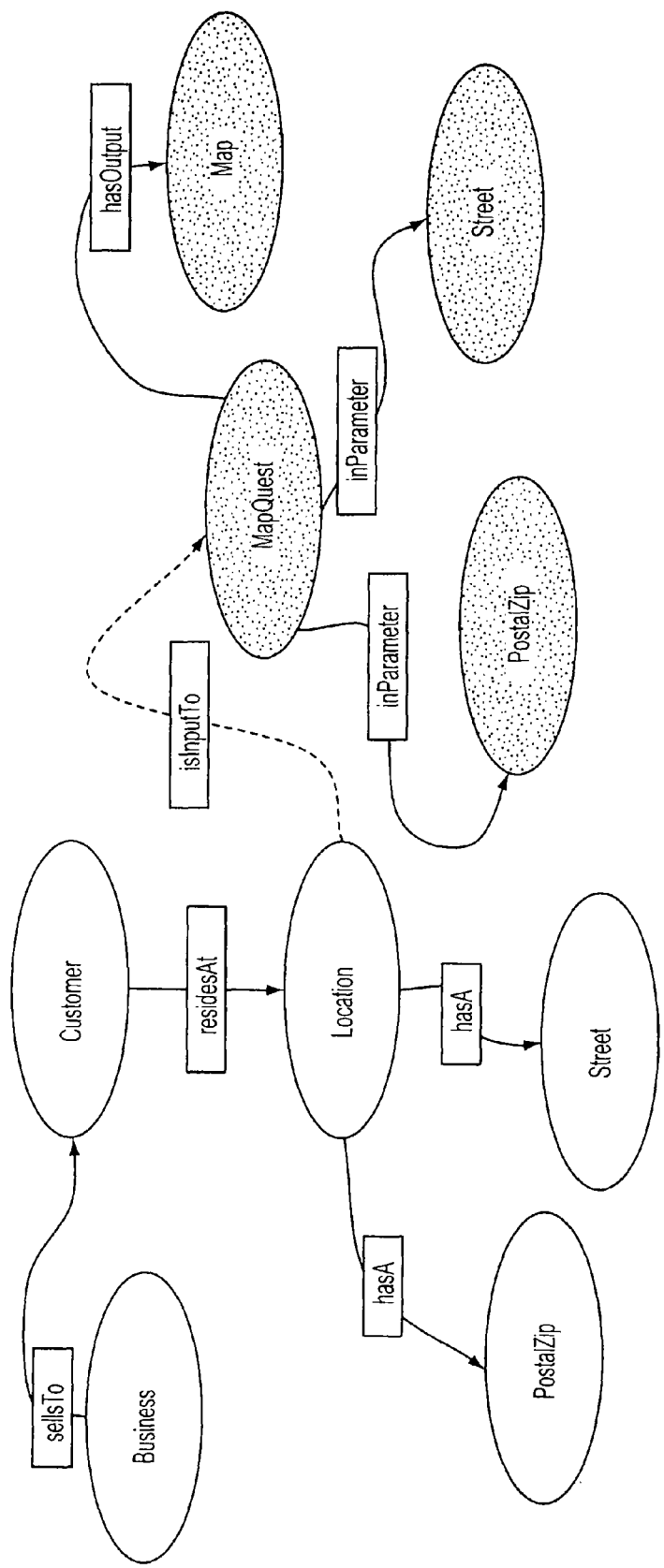
FIG. 5 is a portion of an augmented domain ontology $D^+$.

The map-finding web service is then mapped to an upper ontology $W^U$ that models web services as concepts of Inputs (inParameters), Output, Classification Conditions, and Effects, as shown in FIG. 4. An instance of this ontology, $W^I$, is created for the map-generation web service of the example. This ontology is then mapped to $D^+$ to form augmented ontology $D^{++}$, for example using the relationship isInputTo, e.g. $D^{++}$::{$D^+$::Location, isInputTo, $W^I$::MapQuest}. A portion of $D^{++}$, showing a link between $W^I$ and $D^+$, is shown in FIG. 5.

Figure 6:
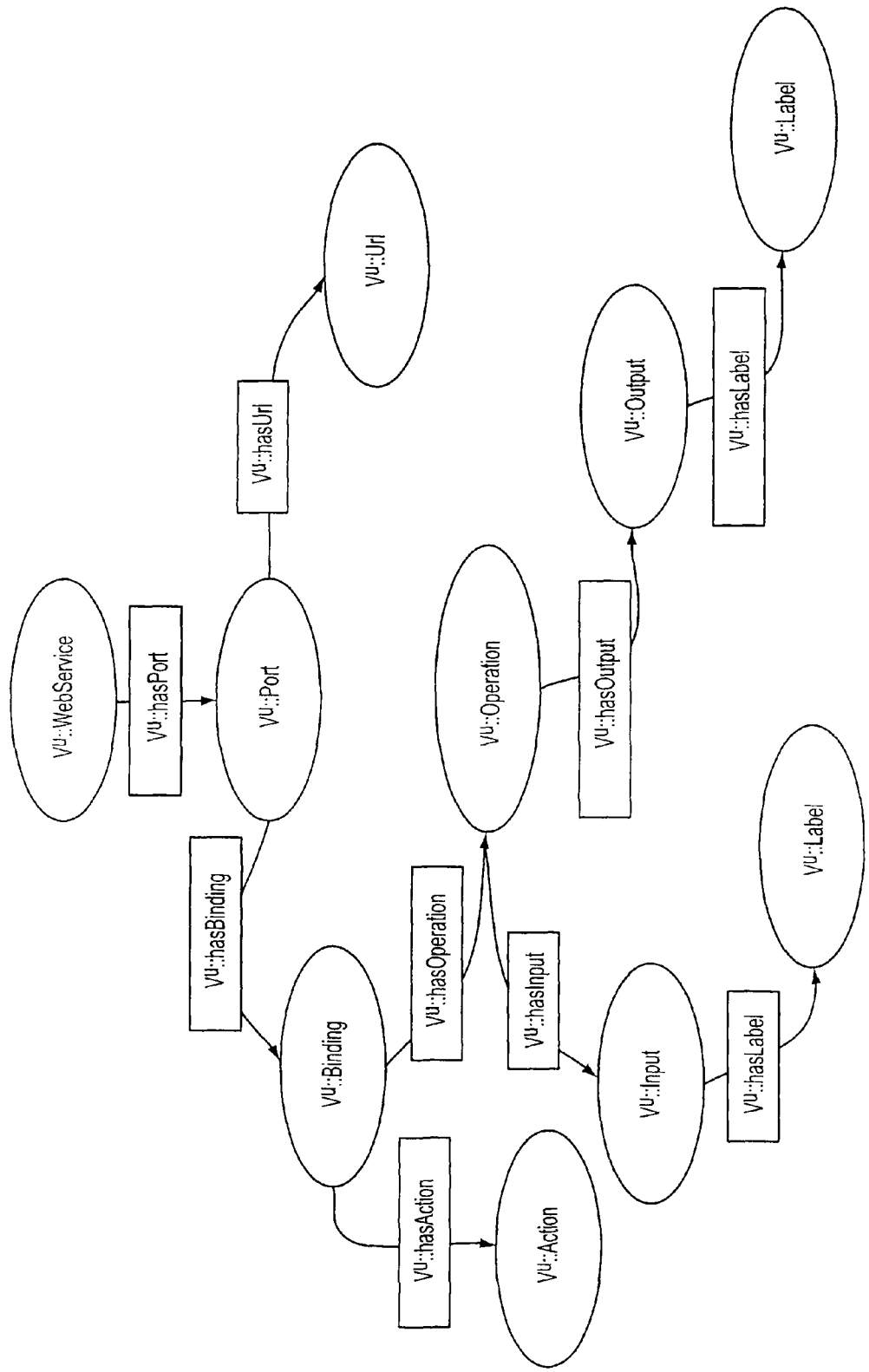
FIG. 6 is a generic upper ontology for accessing a web service.
Figure 7:
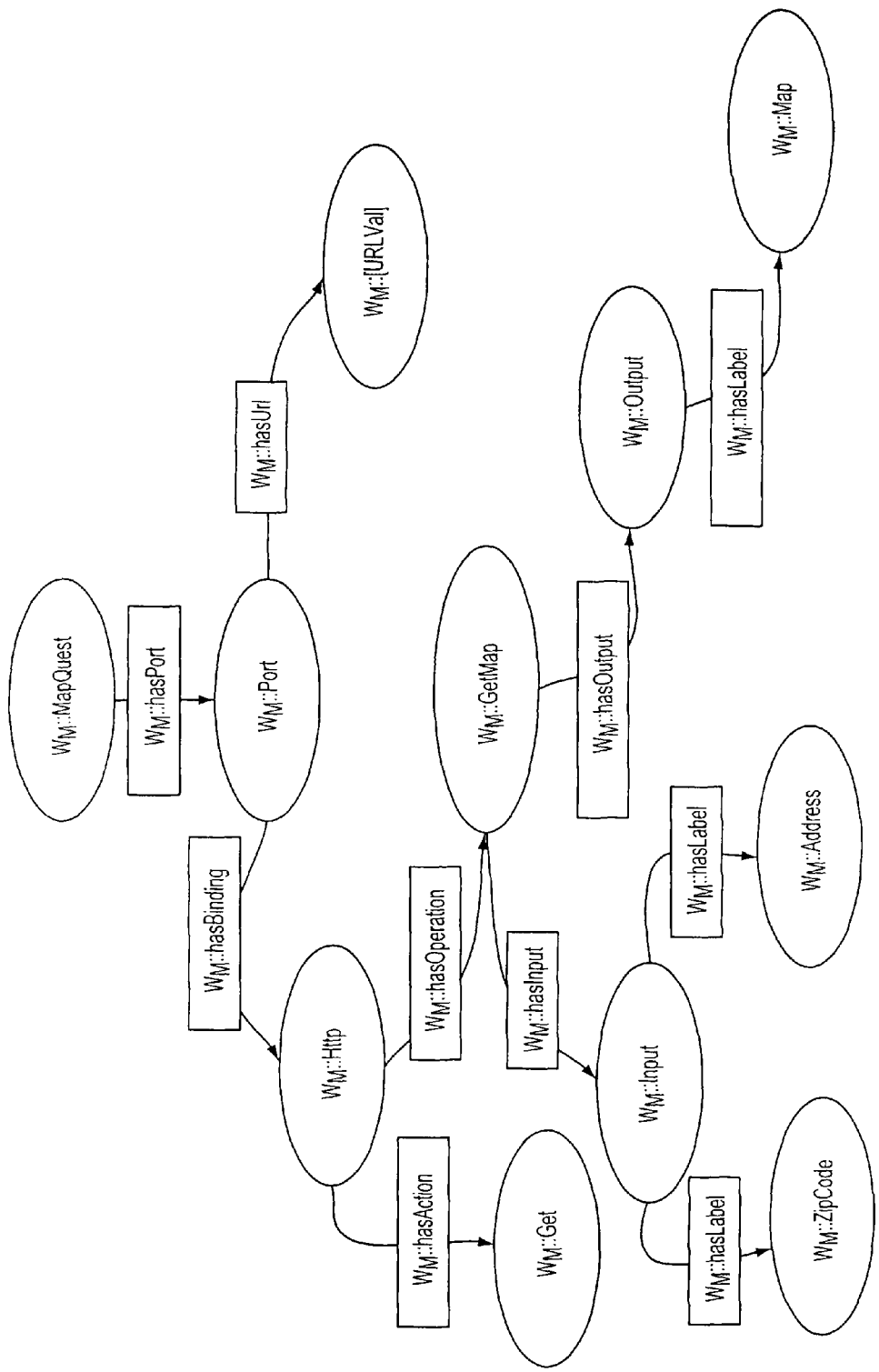
FIG. 7 is an instance of the ontology of FIG. 6 for a specific web service.
Figure 8:
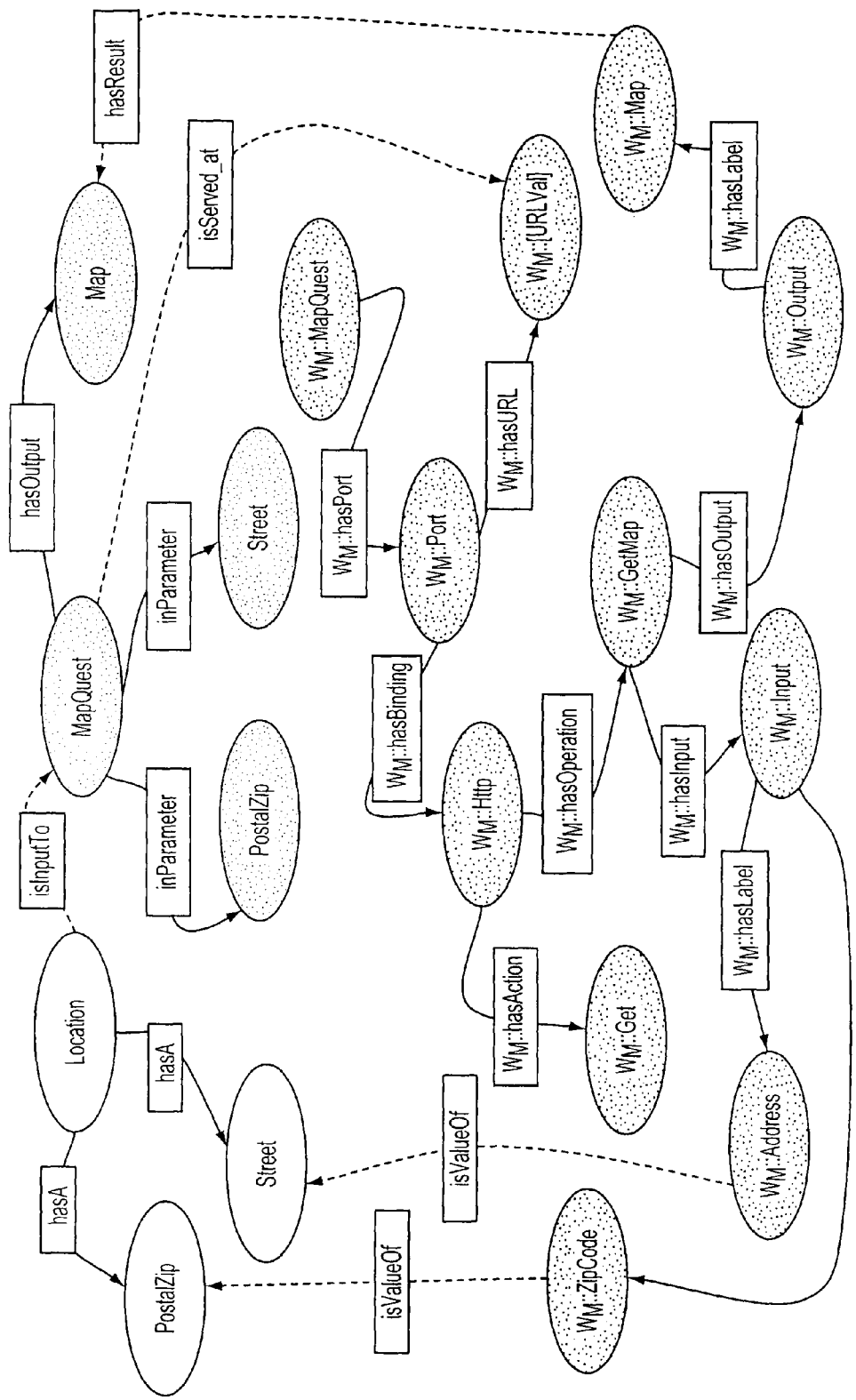
FIG. 8 is a portion of an augmented domain ontology D++.

For automatic code generation, in addition to the ontological representation of the inputs and outputs of the web service, access parameters for the web service may be needed. A generic upper ontology, $V^U$, that models how to access and invoke a web service is shown in FIG. 6. $V^U$ also preserves the structure of any document consumed or produced by the web service. An instance of this ontology, $W_M$, is created to describe the parameters for invoking the web service. As shown in FIG. 7, $W_M$ shows parameters for invoking MapQuest™. (For clarity in the drawing, the URL for MapQuest™, http://mapquest.com/maps/map.adp, is represented as [URL Val]). $W_M$ is then mapped into $D^{++}$, for example using the relationships isValueOf, isServedAt, and hasResult. The isValueOf links the range or object value of the hasLabel relationship in the ontology $W_M$ to concepts in the augmented domain ontology $D^{++}$. The isServedAt relationship links the subject or domain of the hasOutput relationships in the $D^{++}$ ontology to the object of the hasUrl relationship in the $W_M$. The hasResult relationship links the range of hasLabel relationship in the $W_M$ to the range of hasOutput relationship in the ontology $D^{++}$. This relationship is useful when the output of the web service contains the inputs of another, as further discussed below. A portion of $D^{++}$ including $W_M$ and $W^I$ is shown in FIG. 8, illustrating the links between the web service ontologies and the domain ontology.

Once the ontology D++ has been created, a single application (hereinafter, the "Semantic Viewer") can broker a variety of user requests to return data outputs and/or executable glue code. As implemented in this example, the Semantic Viewer is a web-enabled application. When a user enters any input data, it is linked to concepts in the augmented domain ontology using the userInput, userOutput, and userCriteria relationships. The userOutput links a goal the user is interested in a concept in the augmented domain ontology. The userInput links the user's input to the object value of the inParameter relationship that are not input to web services in the augmented domain ontology. The userCriteria is used to link user's input to concepts in the augmented domain ontology.

Figure 9:
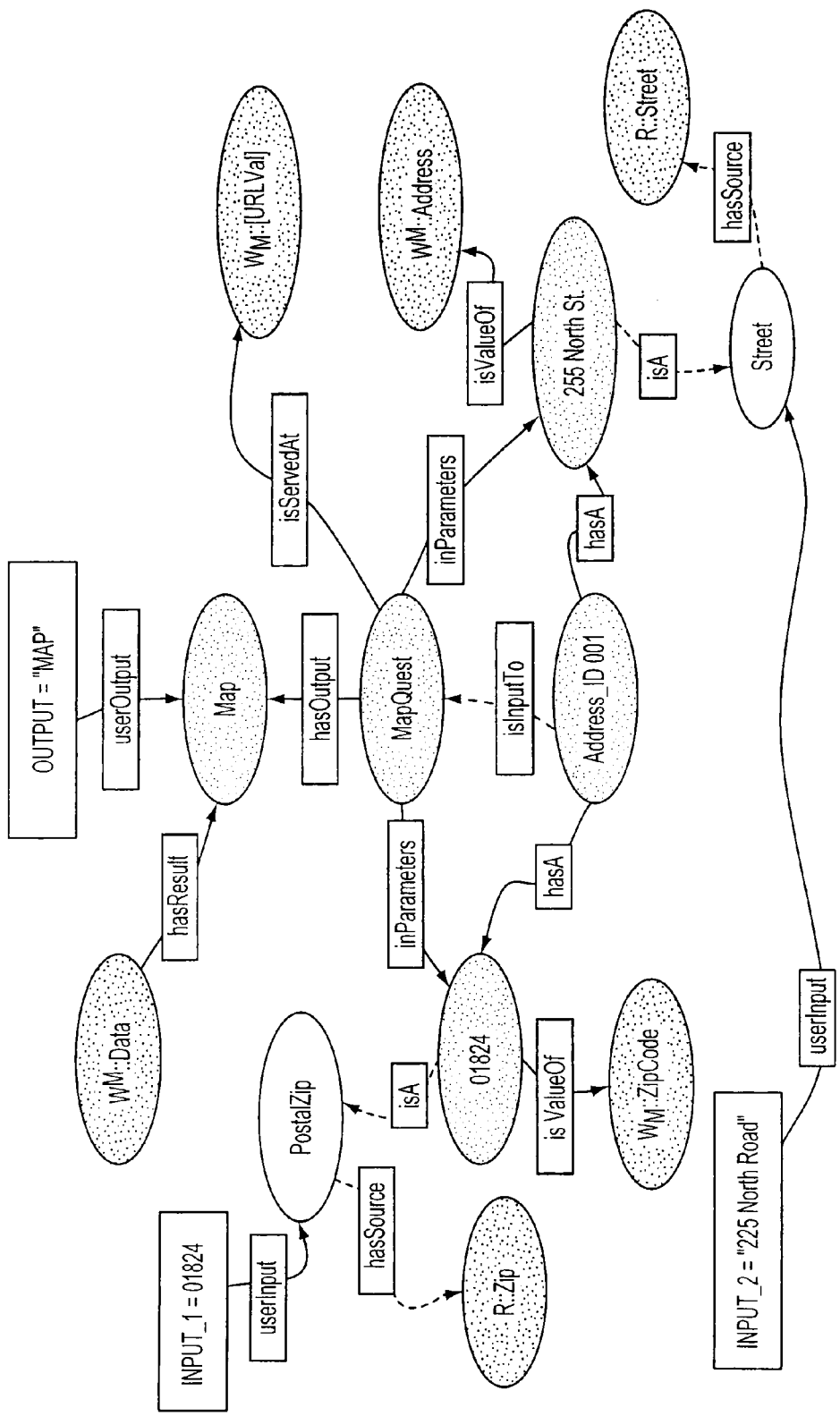
FIGS. 9, 10, 11a, and 11b show execution paths within D++.

For example, suppose a user provides "255 North Road" and "01824" as inputs, and "map" as a requested output. The Semantic Viewer searches $D^{++}$ for matches to the input values, and locates them in $R^L$ as a Street and a Zipcode, respectively. In addition, it searches for "map" and locates it as a concept in $W^I$. It then locates a path through the ontology graph linking the inputs with the output, as shown in FIG. 9. Finally, it generates executable glue code to actually invoke the web service discovered (in this case, MapQuest™) and return a map of the requested address.

The above example user inputs are the same as what would be required if the user were simply to visit MapQuest™ and request the map directly, although the user does not have to know how to access MapQuest™ in order to use the Semantic Viewer as described in this example. If multiple map services were available, the Semantic Viewer would present the user with multiple execution paths, allowing access to whichever map service was desired, again without requiring the user to know the URL or data formatting requirements of each service.

Figure 10:
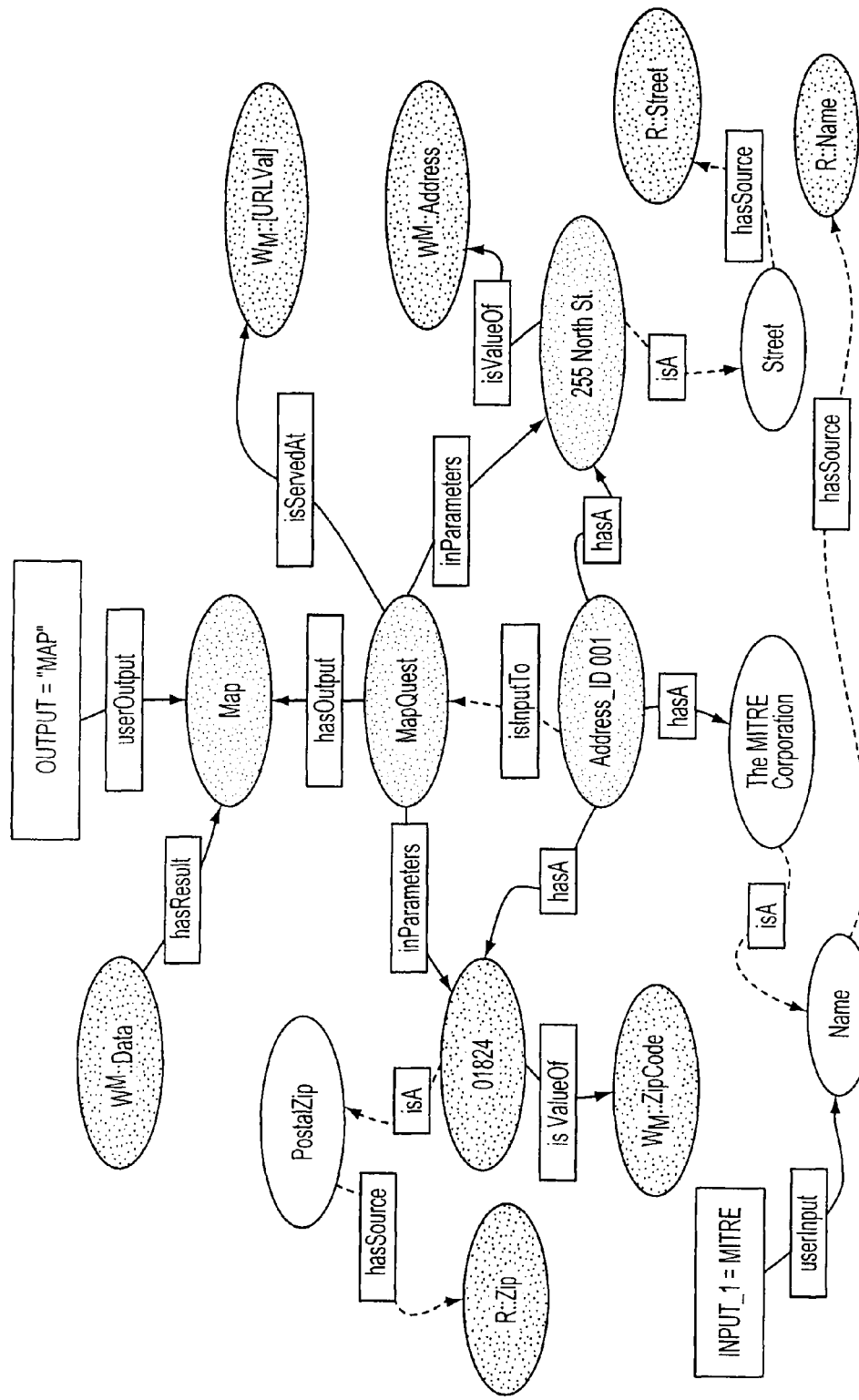

The additional power of the Semantic Viewer can be seen if the user instead enters "MITRE" as an input, and "map" as a requested output. No available web service in $D^{++}$ takes a corporate name and returns a map. However, the Semantic Viewer still locates "MITRE" in the database as an instance of Business_Name, and discovers a path through the ontology graph linking it to the Map output of MapQuest™, as shown in FIG. 10. Thus, the execution path returned now includes a database query to discover the street address of the MITRE Corporation, formats that data for the MapQuest™ map service, and returns a map of the company location.

Figure 11A:
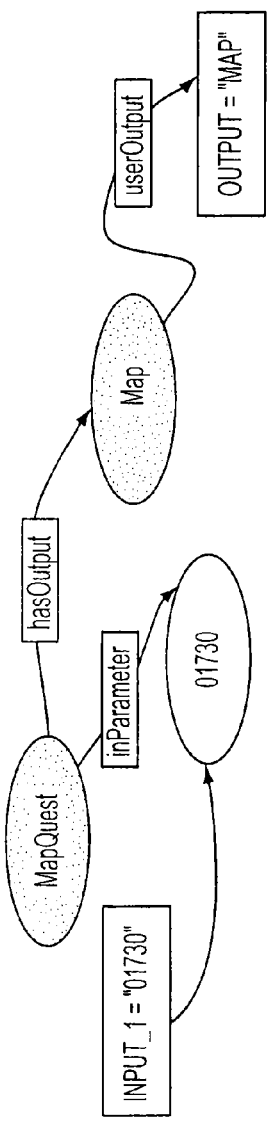
Figure 11B:
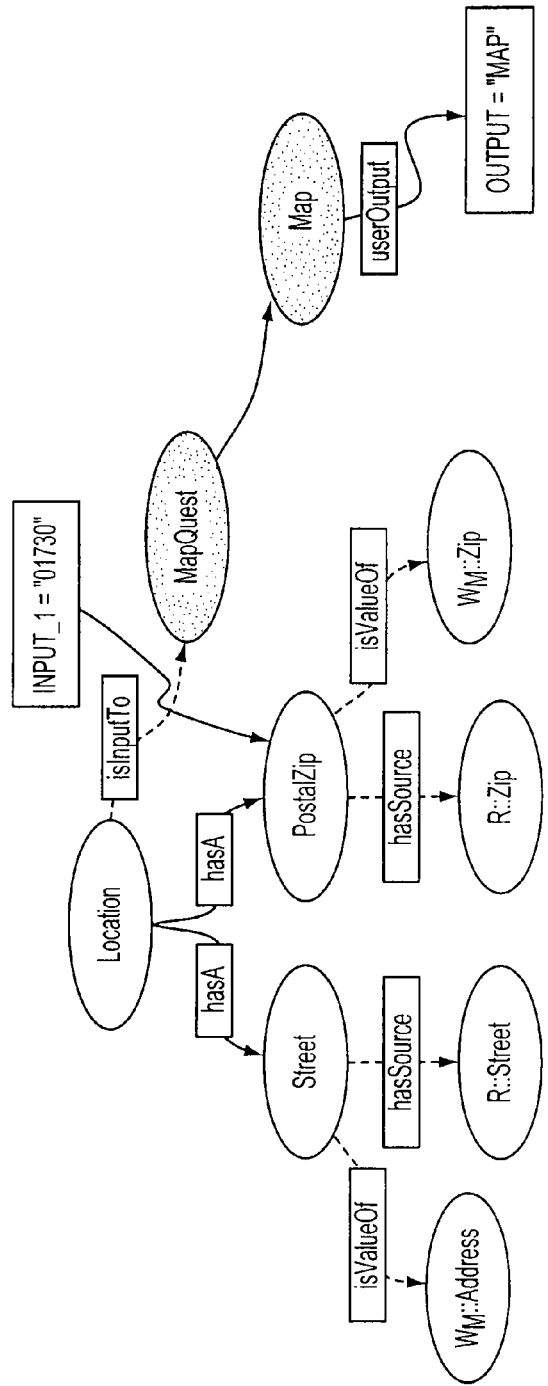

In practice, the Semantic Viewer may find multiple execution paths for a single query. In this case, the user may be presented with the multiple execution paths and allowed to select the desired path. For example, in the case where a user enters a single input of "01730" and a desired output of "map," there are two possible connecting paths through the D++ described above. According to one path, illustrated in FIG. 11a, the Semantic Viewer recognizes "01730" as a zip code, and passes it to MapQuest™ without a street address, resulting in a map of the general area around that zip code (the recognition of "01730" as a zip code according to this path may be through its existence in the database, but it is also within the scope of the invention to manually indicate that 01730 is a zip code in order for the Semantic Viewer to discover an execution path). However, there also exists a path, illustrated in FIG. 11b, in which the Semantic Viewer finds each instance of "01730" in the database, and passes each Street Address/Zipcode combination (for each listed business having that zip code) to MapQuest™, obtaining maps for every business in the selected zip code area.

In the above examples, a single output of a single web service has been the desired output. However, multiple outputs may also be requested, and these outputs may not all be derived from the same web service. For example, suppose a user enters a single input of "01730" and desired outputs of "map" and "business name." In this case, an execution path similar to the second path described in the previous paragraph exists. The Semantic Viewer recognizes 01730 as a zip code, and queries the database to find all of the businesses in that zip code, requesting both the business name and the street address. The street addresses and the selected zip code are passed to MapQuest™, and the resulting maps are returned along with the business names, for each business in the database that matches the criteria.

The Semantic Viewer may also "chain" web services as necessary to obtain a desired result. For example, suppose the domain ontology also contains the relationships hasVoiceNumber and hasFaxNumber, and has been further augmented to include a reverse lookup telephone service (such as that found at http://www.switchboard.com), which accepts an input "telephone number" and provides a listing name and address. In this case, when a user enters "781-271-2000" as input and "map" as output, one of the returned execution paths will include taking the telephone number from the database listing, passing it to the reverse lookup service to obtain a street address, and passing the street address to MapQuest™ to obtain the requested map.

Similarly, web services may operate in parallel on the same or related inputs to provide multiple outputs. For example, web services that provide maps (as discussed above) and aerial photos (such as that found at http://www.terraserver-usa.com/) may both be called with the same address information, if an address is input and both "map" and "photo" are selected as outputs.

Figure 12:
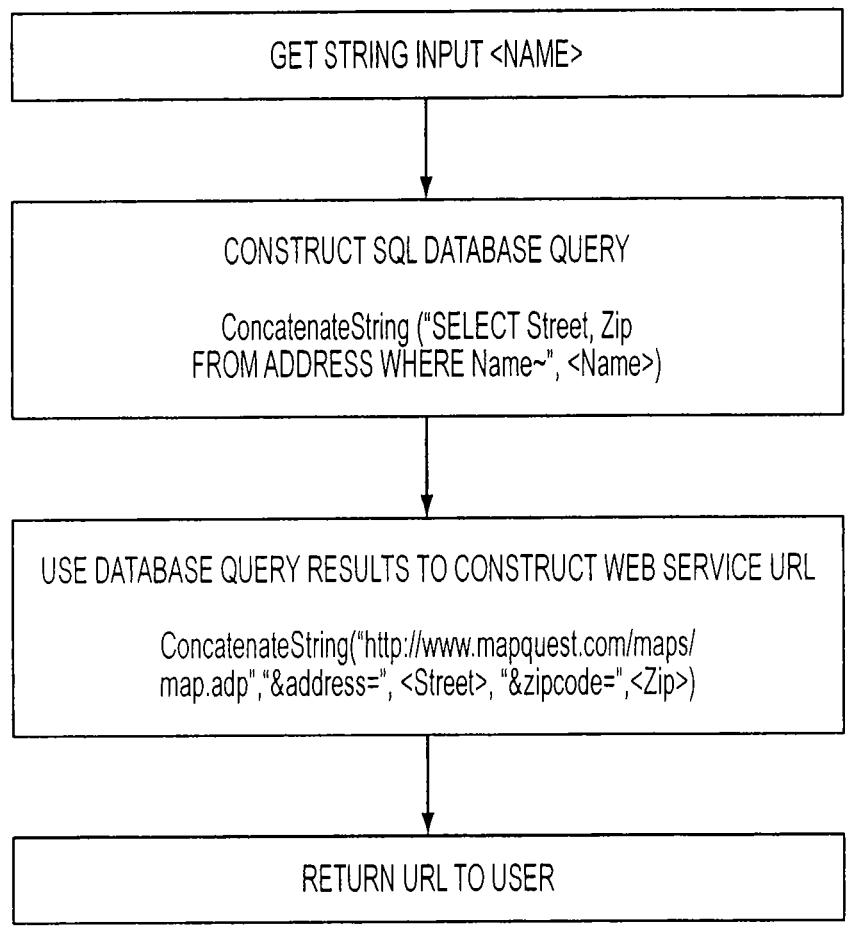
FIG. 12 is a flow chart for a standalone web service whose glue code may be generated by the Semantic Viewer.

For each of the above-described examples, the Semantic Viewer has located an execution path, and then performed the necessary steps to answer a user query. However, the execution path may also be used to generate glue code necessary to create a new service of the type requested. For example, in the case described above in which a user provided the input "MITRE" and the output "map," in addition to simply providing a map of the MITRE location, the Semantic Viewer can also return executable "glue code" for a service that accepts a company name, looks it up in the database to find a street address, passes the street address to MapQuest™, and returns the requested map. This static code can then be directly used to create a new standalone web service which is independent of the Semantic Viewer. A flow chart of the resulting web service, including exemplary pseudocode describing the construction of a SQL database query and a web service URL, is shown in FIG. 12. Of course, the code generated will depend on the specific requirements of the database and web service. Further the database type and query syntax may be represented in ontological form and linked to the R in an analogous way to the construction of $W_M$ for accessing the web service, as discussed above.

Example 2

Figure 13:
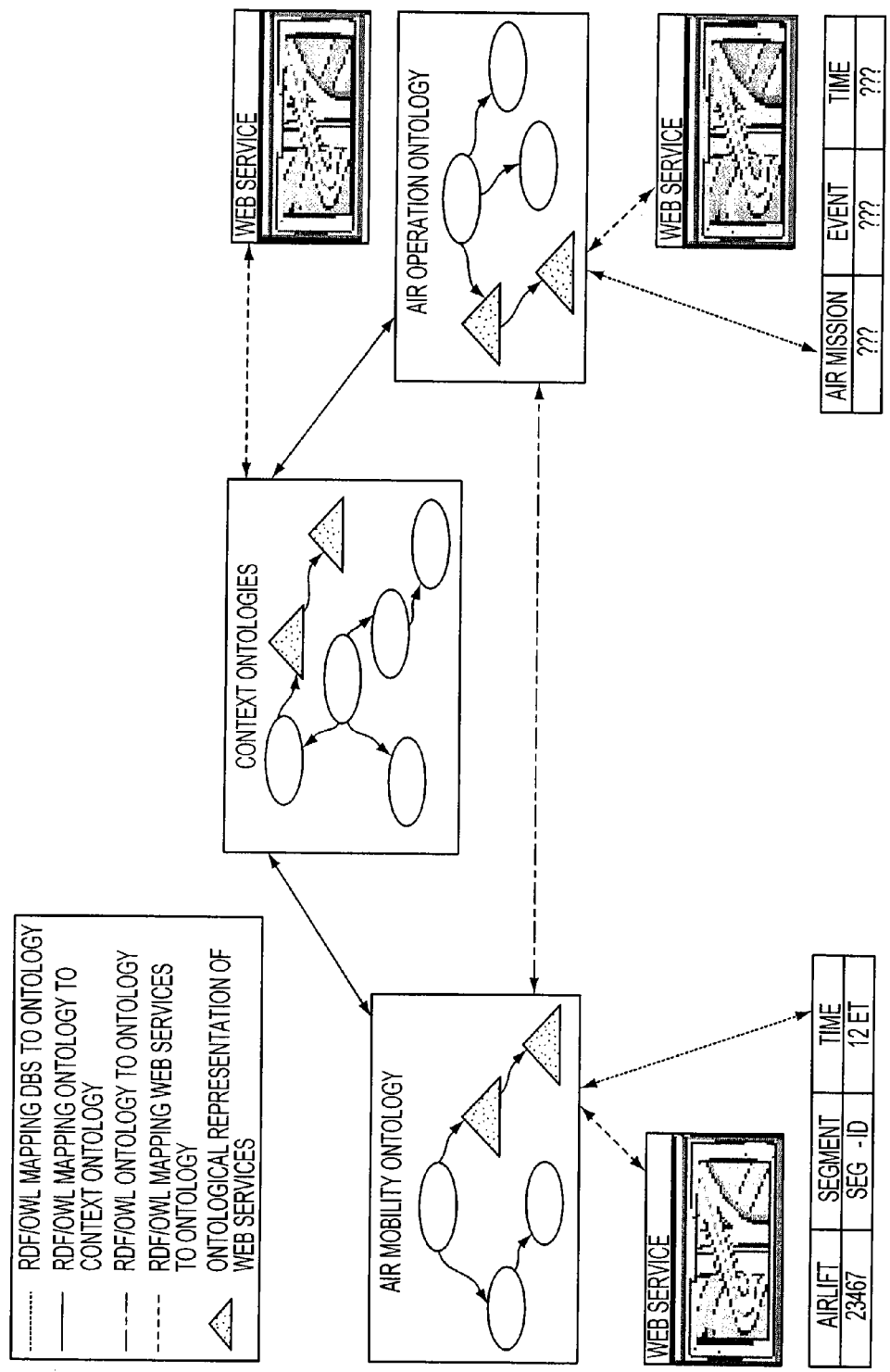
FIG. 13 is schematic diagram outlining a method to integrate multiple, disparate information systems across an enterprise.

Integrating Disparate Information System Ontologies into a Searchable Ontological Structure The following example illustrates how two disparate information systems within a given enterprise may be integrated into a service-oriented architecture according to the present invention. The approach builds upon the semantic framework outlined in Example 1 for the integration of databases and web services within a given information system, and the following example extends this framework to facilitate the integration of multiple information systems within an enterprise. An overview of the approach is shown in FIG. 13, and it encompasses the following steps:

Providing a domain ontology for each information system

Providing a context ontology to capture commonly-held concepts and their representations on each information system Creating and linking a translator web service ontology to the domain ontology Mapping the individual information system ontologies to the context ontology Mapping the concepts across individual information system ontologies Brokering a request to suggest workflows between a data instance on a source information system and a corresponding concept on a target information system Automatically executing one, or more, of these generated workflows to create the corresponding data instance on a target information system.

Figure 14:
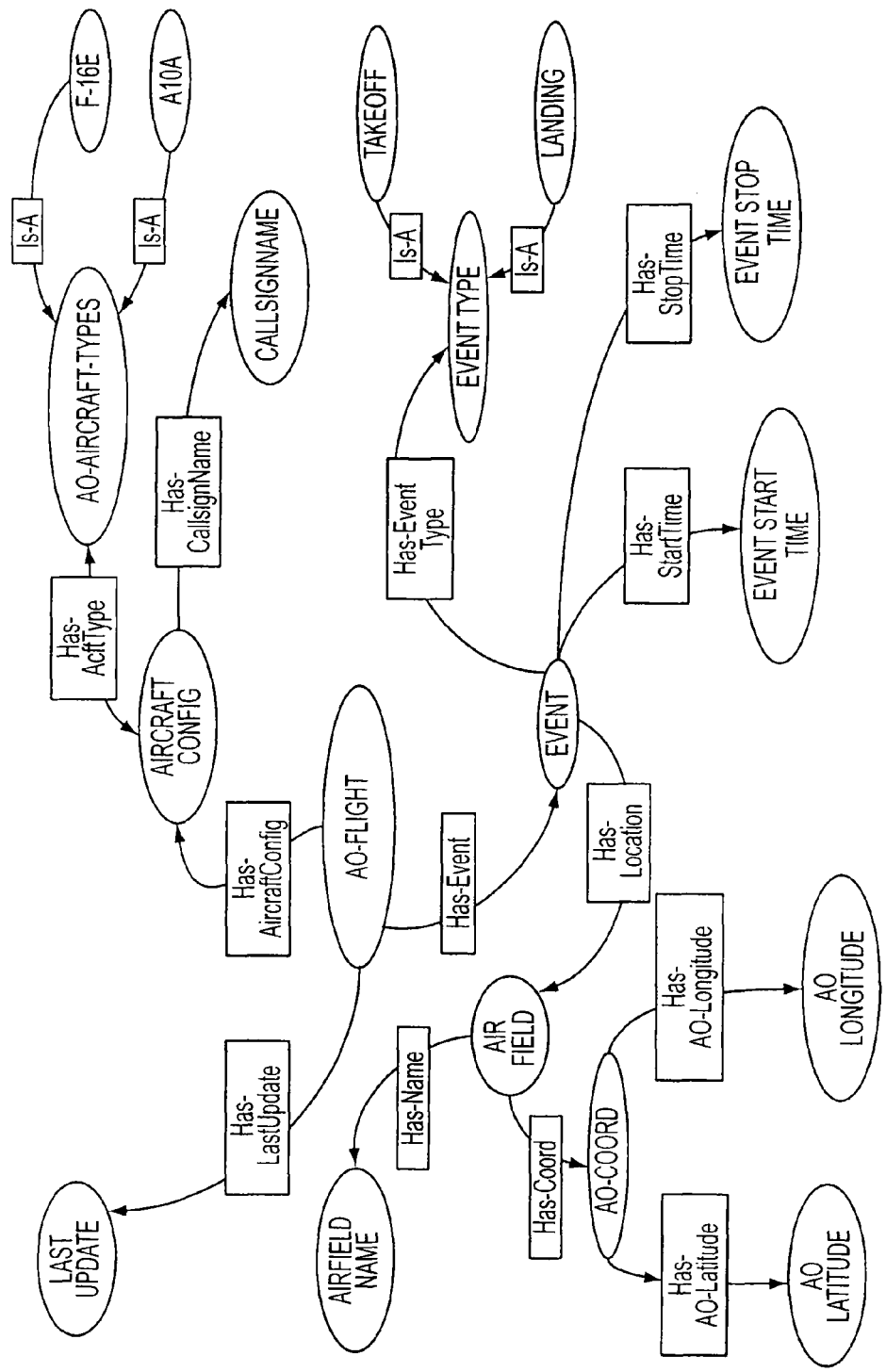
FIG. 14 is a portion of an Air Mobility (AM) system ontology.
Figure 15:
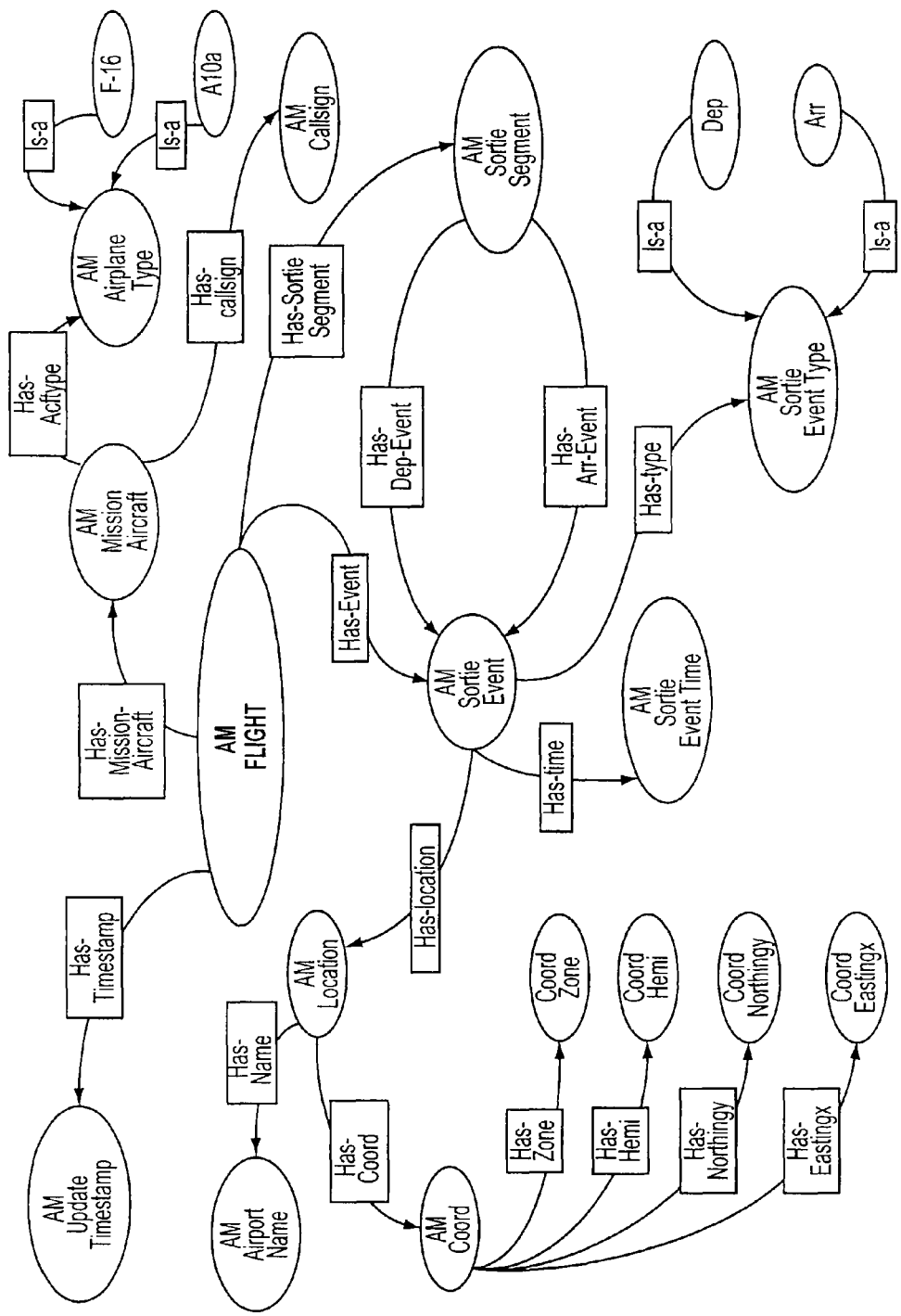
FIG. 15 is a portion of an Air Operations (AO) system ontology.
Figure 16:
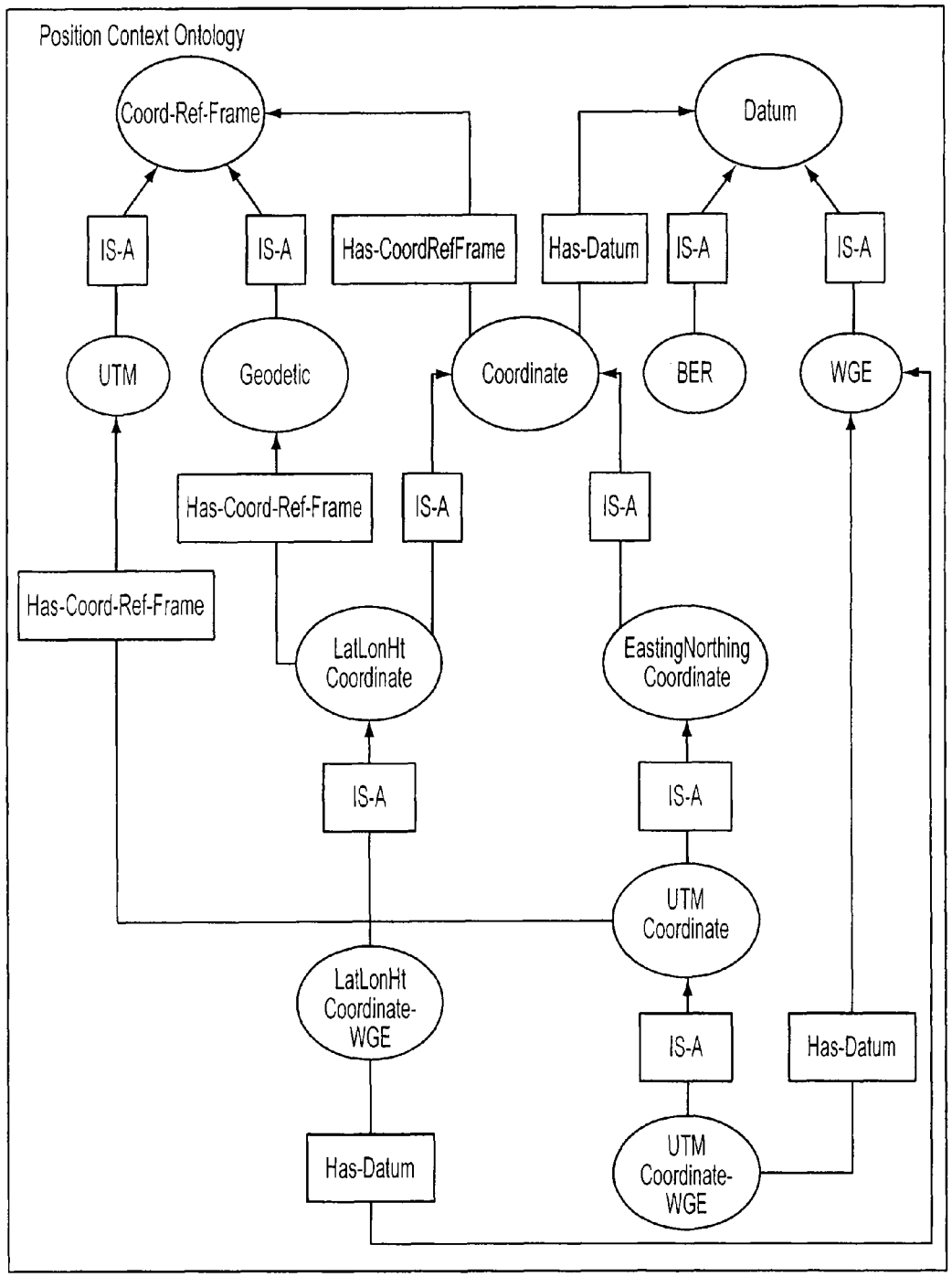
FIG. 16 is a portion of a Position context ontology.

The example below discusses the integration of two distinct air-flight scheduling systems, Air Mobility (AM) and Air Operations (AO), within the Department of Defense (DoD) enterprise. Each flight scheduling system represents an information system, and the concepts that characterize each information system are included within its respective domain ontology. The AO and AM domain ontologies are built using OWL/RDF relations and are represented as a uniform structure of triples in a fashion similar to that outlined in Example 1. FIG. 14 and FIG. 15 graphically represent selected portions of the AM and AO domain ontologies, respectively.

Although both the AM and AO ontologies describe aircraft and related events, FIG. 14 and FIG. 15 indicate that significant distinctions exist in the structure, representation and terminology these concepts across the AM and AO systems. For example, the AM ontology represents position using the Universal Transverse Mercator (UTM) coordinates, while the AO ontology represents position with Geodetic coordinates. A similar discrepancy is noted between the terminology used by the AM and AO ontologies to denote equivalent Aircraft Types. Further, the AM and AO ontologies use different overall structures to represent particular flight concepts. For example, the AO ontology provides both starting and stopping times for events, while the AM ontology uses only a single event time.

To provide interoperability between information systems in the enterprise, or in this example between the AM and AO systems, a number of "context ontologies" must be created to account for the representational, structural, and terminological mismatches between these respective systems. These "context ontologies" capture concepts commonly held across the enterprise and account for the representation of a particular concept on each information system. The following example addresses three such context ontologies: Position, Time, and Types of Things, i.e., Where, When and What.

The Position context ontology contains comprehensive specifications of the different representations of a Geo-Coordinate point within the AM and AO domain ontologies (e.g., the genus of Coordinate Systems, Datums, Coordinate Reference Frames and formats). In the following example, the Position context ontology is based on the set of coordinate systems used by National Geospatial Agency (National Imagery and Mapping Agency (NIMA) USA, GEOTRANS 2.2.4-Geographic Translator, as described at http://earth-info.nima.mil/GandG/geotrans, incorporated herein by reference).

A small portion of the overall Position context ontology is presented in Using this ontology, any Geo-Coordinate position may be disambiguated by specifying its Coordinate System, its Coordinate Reference Frame, and its Datum using OWL classes and object properties. These particular classes, and the relationships between them, are defined in the context ontology, and a partial listing of these definitions is given below (for a more complete listing of classes and relationships, see Sabbouh, et al., "Using Semantic Web Technologies to Enable Interoperability of Disparate Information Systems," as described at http://www.mitre.org/work/tech_papers/tech_papers_05/05_1025/05_1025.pdf, incorporated herein by reference in its entirety):

```
<owl:Class rdf:id="COORDINATE"/>
<owl:Class rdf:id="DATUM"/>
<owl:Class rdf:id="COORD-REF-FRAME"/>
<owl:ObjectProperty rdf:ID=" Has-Datum">
    <rdfs:domain rdf:resource="#COORDINATE "/>
    <rdfs:range rdf:resource="#DATUM "/>
</owl:ObjectProperty>
<owl:ObjectProperty rdf:ID=" Has-Coord-Ref-Frame">
    <rdfs:domain rdf:resource="#COORDINATE "/>
    <rdfs:range rdf:resource="#COORD-REF-FRAME"/>
</owl:ObjectProperty>
```

Context ontologies are specified in a similar fashion for the ubiquitous Time and Types of Things concepts. A number of Time ontologies are publicly available (e.g., Hobbs, J., "A DAML ontology of time", 2002, as described at http://www.cs.rochester.edu/~ferguson/daml/daml-time-nov2002.txt, incorporated herein by reference), and these ontologies are generally based on the numerous representations of date and time used by the military (e.g., mm/dd/yyyy, Zulu, EST, etc.). The OWL classes and relationships used within the Time context ontology thus closely mimic those used in the Position context ontology.

Two different variants of the Types of Things context ontology have been discerned for the AM and AO systems: Aircraft-Types, and Event-Types. These context ontologies contain the different representations of aircrafts and events that are used by both systems, and as a result, two subtypes for Aircraft-Types and Event-Types have been developed. Table 6 provides a partial listing of these subtypes.

TABLE 6

AM-AIRCRAFT-TYPES subClassOf AIRCRAFT-TYPES
AO-AIRCRAFT-TYPES subClassOf AIRCRAFT-TYPES
F-16 instanceOf(OWL Individual) AM-AIRCRAFT-TYPES
F-16E instanceOf(OWL Individual) AO-AIRCRAFT-TYPES
AM-EVENT-TYPES subClassOf EVENT- TYPES
AO-EVENT-TYPES subClassOf EVENT- TYPES
DEP instanceOf(OWL Individual) AM-EVENT- TYPES
TAKEOFF instanceOf(OWL Individual) AO-EVENT- TYPES A "translator web service" must be associated with each context ontology to translate between the distinct data representations on each information system ontology. The following example utilizes the GeoTrans web service, a translator web service based on the Geographic Translator (see National Imagery and Mapping Agency (NIMA) USA, GEOTRANS 2.2.4-Geographic Translator, http://earth-info.nima.mil/GandG/geotrans/, incorporated herein by reference in its entirety). Although concentrating on a particular web service and the Position context ontology, the approach outlined in the example is easily extended to include other appropriate web services and additional context ontologies.

Figure 17:
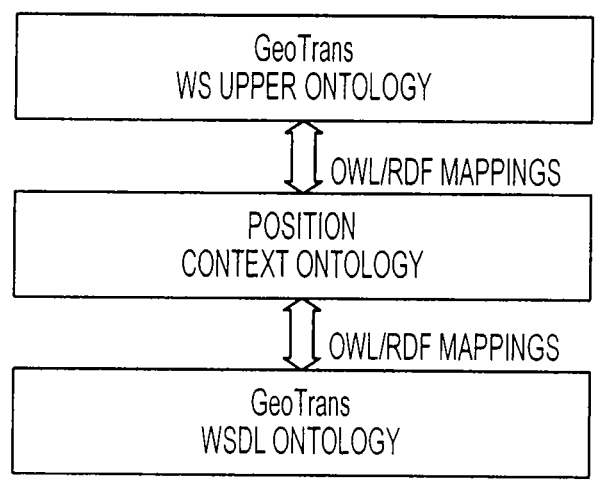
FIG. 17 is a flow chart of a method to integrate web service and context ontologies.

The integration of the GeoTrans web service into the Position context ontology is outlined in FIG. 17, and the approach follows the process outlined in Example 1 for the integration of a generic web service into a domain ontology. Prior to integration, the GeoTrans WSDL ontology must be re-created from the GeoTrans WSDL file stored in the ontology management system. The GeoTrans web service must also be mapped to an upper ontology to create a GeoTrans web service upper ontology. The GeoTrans upper ontology and the GeoTrans WSDL ontology are then linked to the Position context ontology using OWL/RDF mappings to form an augmented ontology.

Figure 18:
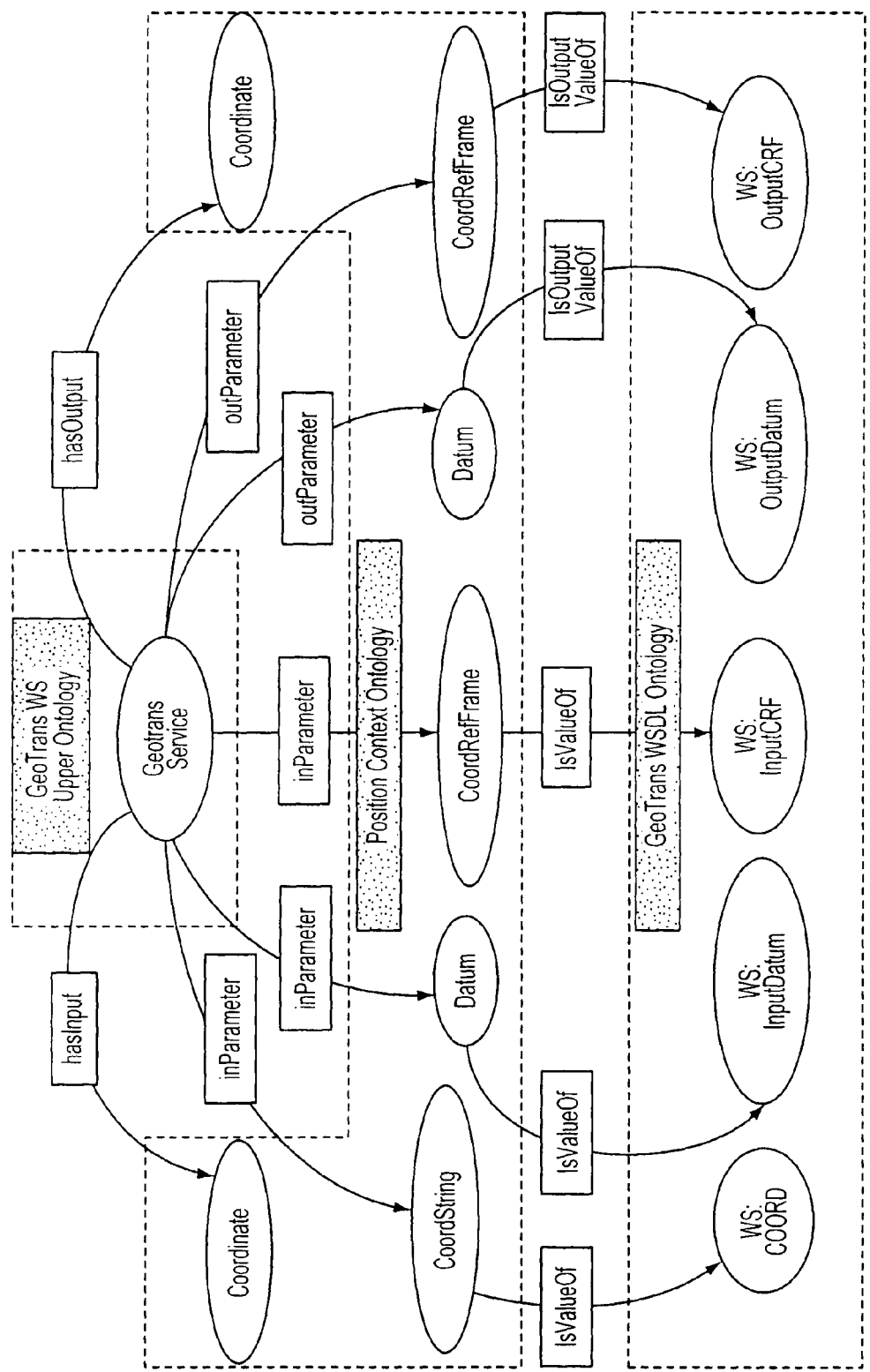
FIG. 18 is a portion of a GeoTrans web service descriptor language (WSDL) ontology.

FIG. 18 graphically presents a portion of the GeoTrans upper ontology, the WSDL ontology, and the mappings that connect each to the Position context ontology. The OWL/RDF mappings in FIG. 18, as well as their domains and ranges, are summarized in Table 7. While the example employs these mappings to connect a web service to a context ontology, these same mappings could be employed to connect a generic web service to an IS domain ontology.

Figure 19:
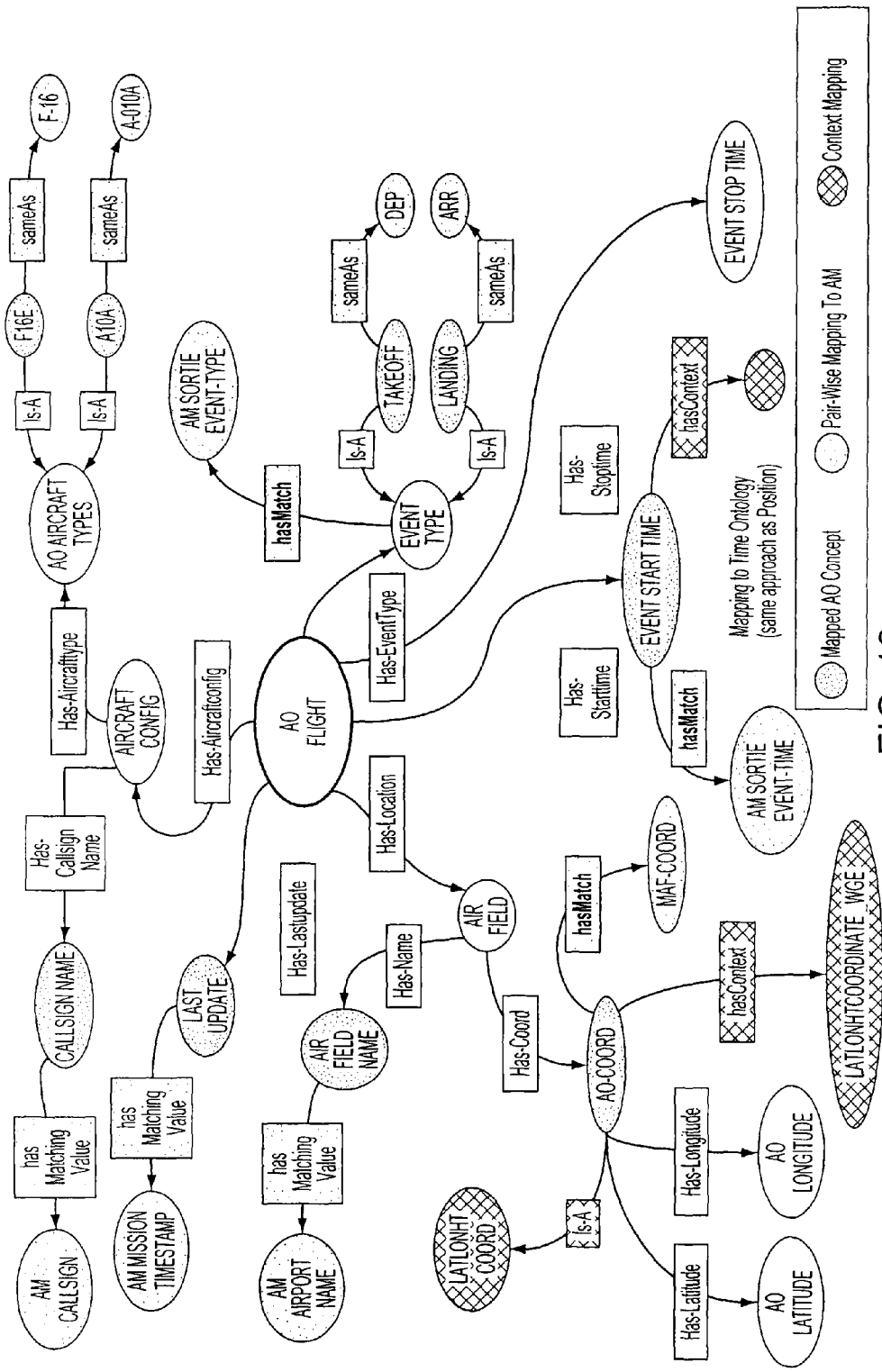
FIG. 19 is a portion of an AO system ontology mapped onto a portion of the AM system ontology and the Position context ontology.

The relevant concepts in the AM ontology must then be mapped to the corresponding concepts in the AO ontology to enable the exchange of data instances between the AM and AO information systems. This required mapping occurs in two steps. The individual concepts in the AM ontology are first matched with corresponding concepts in the AO ontology to generate semantic matches between concepts. Concepts within the AM and AO ontologies are then independently mapped to the context ontology to resolve representational mismatches. Note that concept matching requires agreement between the AO and AM users, whereas mapping to context ontologies is done independently for each system. Table 8 lists a number of the OWL/RDF mappings that link concepts in the AM and AO domain ontologies to the context ontology, and FIG. 19 presents a portion of the AO ontology fully mapped to the AM and Position context ontologies.

TABLE 7

| Domain | OWL/RDF Mappings | Range |
| --- | --- | --- |
| rdfs: Class (in Context Ontology) | isInputOf | Webservice: Class (in WS upper ontology) |
| Webservice: Class (in WS upper ontology) | hasInput (inverseOf isInputOf) | rdfs: Class (in Context Ontology) |
| rdfs: Class (in Context Ontology) | isOutputOf | Webservice: Class (in WS upper ontology) |
| Webservice: Class (in WS upper ontology) | hasOutput | rdfs: Class (in Context Ontology) |
| Webservice: Class (in WS upper ontology) | inParameter | rdfs: Class (in Context Ontology) |
| Webservice: Class (in WS upper ontology) | outParameter | rdfs: Class (in Context Ontology) |

TABLE 7-continued

| Domain | OWL/RDF Mappings | Range |
|---|---|---|
| Webservice: Class (in WS upper ontology) | hasEffect | rdfs: Class (in Context Ontology) |
| Webservice: Class (in WS upper ontology) | hasClassification Condition | rdfs: Class (in Context Ontology) |
| rdfs: Class (in Context Ontology) | isValueOf | rdfs: Class (in WS WSDL Ontology) |
| rdfs: Class (in Context Ontology) | isOutputValueOf | rdfs: Class (in WS WSDL Ontology) |
| rdfs: Class (in Context Ontology) | hasResult | rdfs: Class (in WS WSDL Ontology) |
| rdfs: Class (in Ontology) | isCorrelatedWith | rdfs: Class (in Ontology) |

TABLE 8

| Domain | OWL Object Property | Range | When to Use |
|---|---|---|---|
| rdfs: Class (in IS Ontology) | hasContext | rdfs: Class (in Context Ontology) | Representational change |
| rdfs: Class (in Context Ontology) | isTheContextOf (inverse of hasContext) | rdfs: Class (in IS Ontology) | Representational change |
| rdfs: Class (in IS Ontology) | hasMatch (symmetric) | rdfs: Class (in IS Ontology) | Representational change |
| rdfs: Class (in IS Ontology) | hasMatchingValue (symmetric) | rdfs: Class (in IS Ontology) | No representational change |

The OWL/RDF mappings in Table 8 are asserted to match equivalent concepts in the AM and AO domain ontologies and to resolve the resulting mismatches. The following mapping could be asserted when instance values can be copied from the AM system directly to the AO system without transformation:

AIR-FIELD-NAME hasMatchingValue AM-AIRPORT-NAME.

Representational mismatch between coordinates in the AO and AM domain ontologies could be resolved through the assertion of the following sequence of mappings:

AO-COORD hasContext LATLONHTCOORDINATE_WGE
AM-COORD hasContext UTMCOORDINATE_WGE
AO-COORD hasMatch AM-COORD To reconcile terminology mismatches between various event types or various aircraft types in the AM and AO systems, the following mappings could be asserted:

AM-AIRCRAFT-TYPES hasMatch AO-AIRCRAFT-TYPES
AM-EVENT-TYPES hasMatch AO-EVENT-TYPES
F-16E OWL:sameAs F-16
DEP OWL:sameAs TAKEOFF
ARR OWL:sameAs LANDING The approach outlined by the present example, although describing only a small number of potential mappings, can be easily extended to include any number of appropriate OWL/RDF mapping relations.

Figure 20:
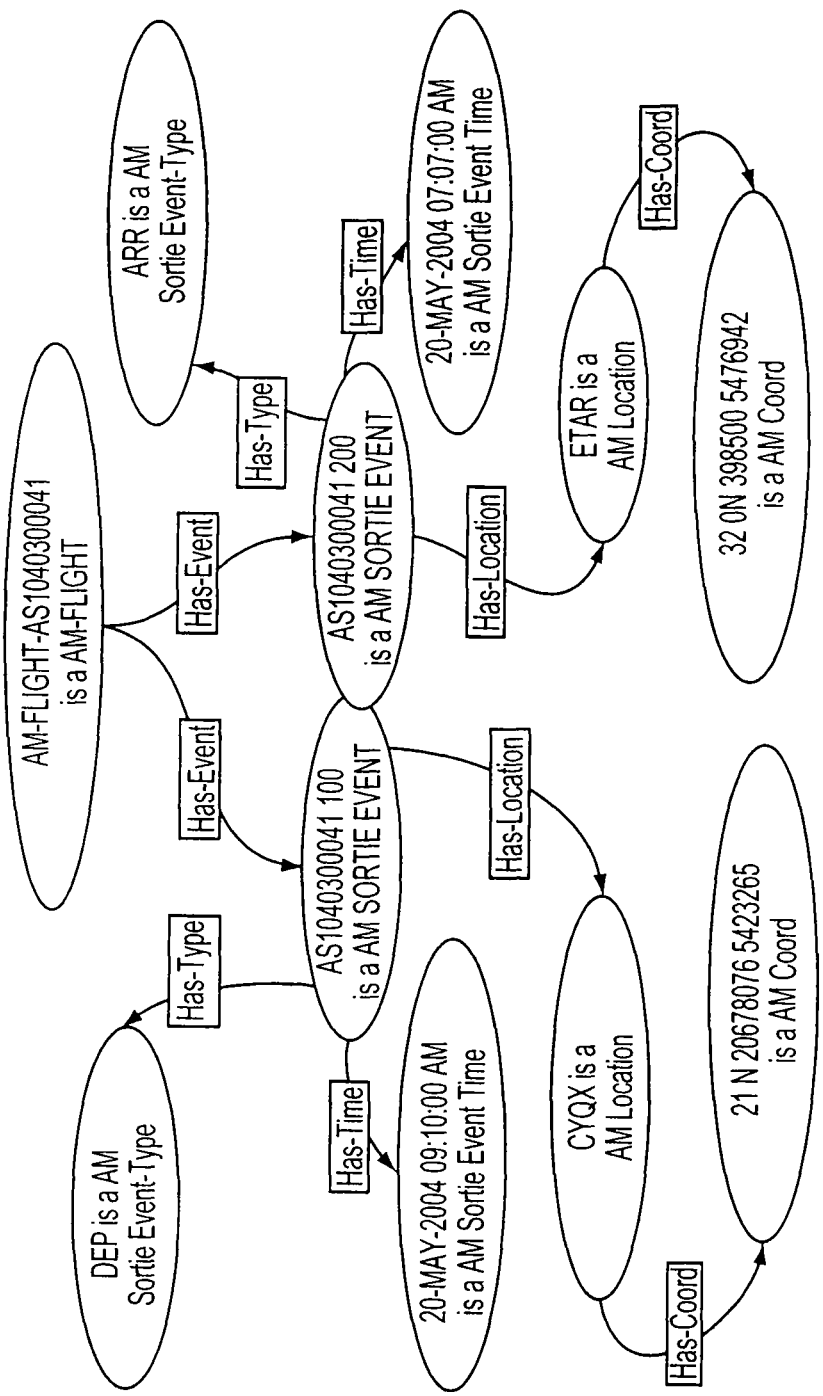
FIG. 20 is a portion of an AM system ontology onto which AM instance data has been mapped.

Having accomplished the mapping of web service ontologies and IS ontologies to context ontologies, the AM database is then mapped onto the AM domain ontology. The mapping process closely follows the approach outlined in Example 1, and once linked, the AM data are treated as instances of the AM ontology. FIG. 20 presents a portion of the resulting augmented AM ontology.

To create AM data on the AO system, the AM data instances must be translated to match the structure, terminology, and representations of concepts on the AO system. To accomplish this end, a mapping interpreter, Onto-Mapper, is built to process the OWL/RDF mappings presented in Table 8 and to create new AO instance data from corresponding data on the AM system. In the semantic framework of the invention, the Onto-Mapper is built as a specialized web service that acts as a Service Agent to be invoked only upon data exchange. Rather than have arbitrary inputs and outputs, this specialized web service interprets the RDF/OWL links to create instance data in a target system from data that originated in a source system. Table 9 outlines the formal definition of the Onto-Mapper.

TABLE 9

Service-Agent subClassOf Web-Service
Onto-Mapper subClassOf Service-Agent
hasAgentInput subProperty hasInput
hasAgentOutput subProperty hasOutput
isAgentInputOf subProperty isInputOf
isAgentOutputOf subProperty isOutputOf
isAgentInputOf InverseOf hasAgentInput
isAgentOutputOf InverseOf hasAgentOutput Then, to translate an AM instance data into an AO instance data, the Semantic Viewer reasons with the mapped ontologies to discover workflows, to invoke/execute/process web services, and to create the corresponding AO instance. The reasoning process employs a combination of graph-traversal algorithms and invocations of the Onto-Mapper. The invention makes extensive use of two graph traversal algorithms: Direct Path Query (DPQ), and Incoming Intersection Query (IIQ).

Given a list of input values and a desired output, the DPQ creates the set of all the direct paths that lead to the desired output concept from the input concepts. The DPQ algorithm may be defined more formally below:

For input list $i_n$, output v
Find the direct paths $P_k$ $\{p_1, p_2, \ldots\}$ ending with v, and starting with each i in $i_n$, where a direct path is the sequence of nodes (i.e., concepts in the ontology graph) and relations or links that connects them. The system can be configured to exclude nodes connected by specific links or to only return paths containing certain links.

Figure 21:
FIG. 21 is an example of an initial workflow obtained after applying the DPQ and IIQ graph traversal algorithms to the mapped ontologies.

The IIQ algorithm creates the set of all the direct paths that lead to the desired output concept using a DPQ. For each input value, the algorithm then creates the set of direct paths that lead to the given input. Third, the algorithm calculates and returns the intersection of these sets. This IIQ algorithm may be defined more formally as follows:

For input list $i_n$, output v
Find the list of nodes $x_i$ $\{x_1, x_2, \ldots\}$ that has direct paths $P_k$ $\{p_1, p_2, \ldots\}$ with v
For each i in $i_n$, find the list of nodes $y_j$ $\{y_1, y_2, \ldots\}$ that has direct paths $Q_m$ $\{q_1, q_2, \ldots\}$ with i
Return $\{x_i, P_k, Q_m\}$ where $x_i = y_j$ The following example illustrates the translation of a particular data instance on the AM system into corresponding data instance on the AO system. A user specifies the AM-FLIGHT instance AM-FLIGHT-AS1040300041, shown in FIG. 20, as an input to the Semantic Viewer and an instance of AOFLIGHT as an output. To discover the initial workflow, the Semantic Viewer first runs a DPQ and, if no workflow is found, an IIQ. The graph traversal algorithms exclude the inparameter, outParameter, hasMatchingValue, hasMatch, hasContext, and isTheContextOf relationships from the initial search. The returned paths are interpreted as a workflow by the Semantic Viewer if they contain the relationship isInputOf or any its sub-properties. An example of an initial execution path returned by these queries is shown in FIG. 21.

The presence of the RDF/OWL link is AgentInputOf indicates that the Semantic Viewer must invoke the Onto-Mapper to create an instance of the AO-Flight (the object of the hasAgentOutput RDF/OWL link and the output of the OntoMapper). To trigger the invocation of Onto-Mapper, the Semantic Viewer asserts that "Onto-Mapper hasAgentInput AM-FLIGHT" and that "Onto-Mapper hasAgentOutput AO-FLIGHT." The Onto-Mapper searches for representational and terminology mismatches by interpreting hasContext, is TheContextOf, and hasMatch links. The result is a set of workflows (i.e., paths containing is InputOf or its sub-properties) that consist of a sequence of web services that must be processed to reconcile mismatches between the AM and AO domains.

Figure 22:
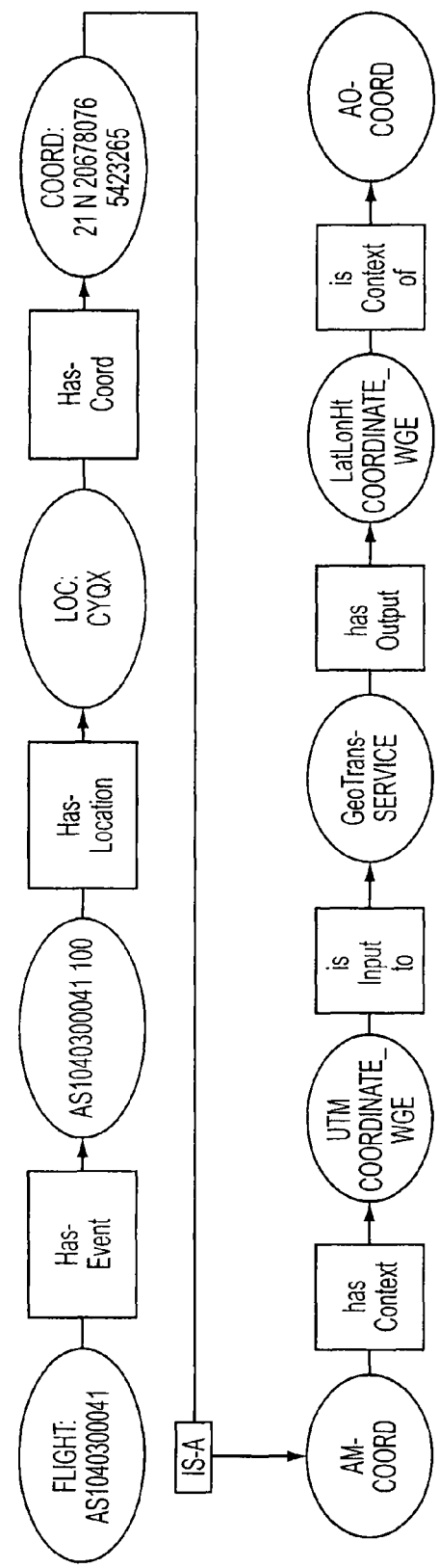
FIG. 22 is an example of a workflow returned by the Semantic Viewer after processing an initial workflow with the Onto-Mapper to resolve mismatches.

An example of such a workflow is shown in FIG. 22. A quick scan of this workflow reveals the pathway that will be executed by the GeoTrans web service to derive the instance value of AO-COORD from COORD: 21 N 20678076 5423265 (an instance of AM-COORD). In addition to the example workflow, the Semantic Viewer finds additional workflows for other instances of AM-COORD that need translation. Although not presented in the example, workflows are discovered for representational mismatches between the Time and Type of Things context ontologies in a similar fashion.

The Semantic Viewer processes the workflow on a node-by-node basis. In the example workflow of FIG. 22, the first node is AM-FLIGHT-AS1040300041, followed by AS1040300041 100, LOC:CYQX, AM COORD 21 N 20678076 5423265, and UTMCoordinate-WGE. Since AM-COORD 21 N 20678076 5423265 inherits the hasContext link to UTMCoordinate-WGE from AM-COORD, the Semantic Viewer makes AM-COORD 21 N 20678076 5423265 an instance of UTMCOORDINATE-WGE. This process links AM-COORD 21 N 20678076 5423265 to GeoTrans using InputOf, and it indicates that the GeoTrans web services must be invoked to translate between the AM and AO systems. Further, since hasOutput links LATLONHT-COORDINATE-WGE to the GeoTrans web service, the resulting output of GeoTrans is an instance of LATLONHT-COORDINATE-WGE. The processing of the is TheContextOf link makes the instance of LATLONHTCOORDI-NATE-WGE an instance of AO-COORD.

The translation step first requires the construction of the URL necessary to invoke the GeoTrans web service. The base URL and parameter names are read from the WSDL ontology, and the parameter values are inferred from the mapped ontology. Specifically, when execution of GeoTrans is requested, its full definition is retrieved from the ontology management system, and the base URL, http://base.mitre.org/Geotrans/, is retrieved from the GeoTrans WSDL ontology. Then for each object of inParameter (e.g. COORDREFFRAME), the Semantic Viewer runs the DPQ with input "COORD: 21 N 20678076 5423265" and with output being the object of inParameter (e.g. COORDREFFRAME).

Figure 23:
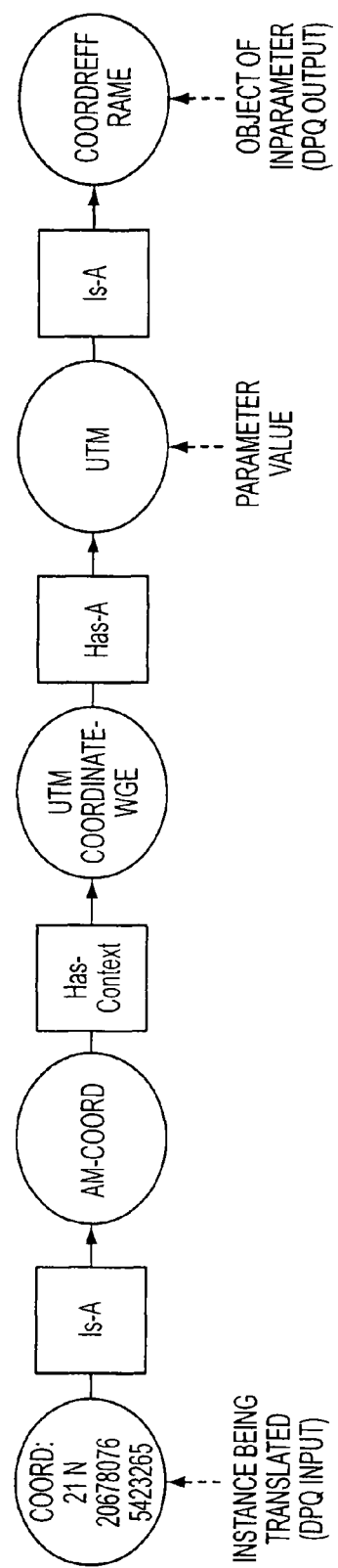
FIG. 23 is an example of a preliminary workflow returned during the execution of the GeoTrans web service.

FIG. 23 illustrates an example of a path returned from the DPQ. The path contains the parameter value to be used in the URL for that object of inParameter (e.g. COORDREF-FRAME). This parameter value is identified in the returned path as the instance of the object of inParameter (e.g., COOR-DREFFRAME). For example, the value of COORDREF-FRAME value is UTM for the example pathway in FIG. 23. The parameter name is then determined by following the link isValueOf, which reveals the label of the parameter name (inputCRF). When the Semantic Viewer has processed all inParameter links, the resulting URL will take the form:

http://base.mitre.org/Geotrans/inputCRF=UTM
&inputDatum=WGE&CoordString=21N
20678076 5423265

Once all of the objects of each inParameter are processed, the Semantic Viewer turns its attention to outParameter. Similar to the processing for inParameter, the Semantic Viewer repeatedly runs the DPQ with input "COORD: 21 N 20678076 5423265" and output being each object of outParameter (e.g., COORDREFFRAME). It then finds the matching parameter label using the isValueOf link. The complete URL is of the form:

http://base.mitre.org/Geotrans/inputCRF=UTM
&inputDatum=WGE&CoordString=21N206780
765423265&outputCRF=Geodetic&outputDatu
m=WGE.

When the invocation of GeoTrans returns the XML document, the Semantic Viewer translates it into an RDF instance of AO-COORD, i.e., AO-COORD: 48.936668,-54.568333. Elements in the XML document are first matched with concepts in the WSDL ontology. The latter are linked to the mapped ontology using the isValueOf and is OutputValueOf links. This creates a LATLONHTCOORDINATE-WGE instance from the XML document. The Semantic Viewer then completes the workflow processing by reclassifying the LAT-LONHTCOORDINATE-WGE instance as an AO-COORD due to the is TheContextOf link between LATLONHTCO-ORDINATE-WGE and AO-COORD. The Semantic Viewer also creates an is CorrelatedWith link is between AM-CO-ORD: 21 N 20678076 5423265 and AO-COORD: 48.936668,-54.568333.

Figure 25:
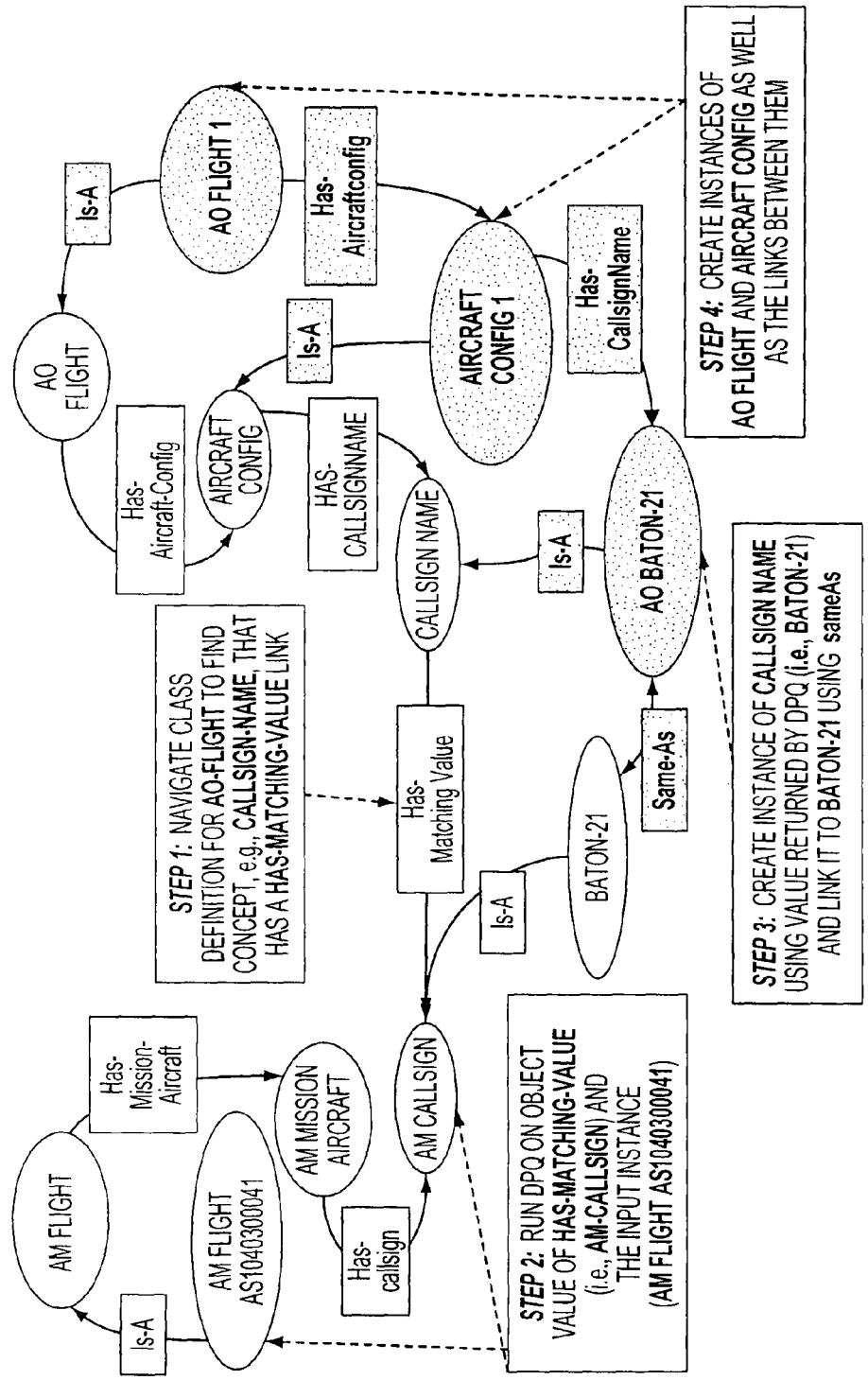
FIG. 25 is a schematic diagram outlining the creation of a new data instance on the AO information system ontology using the hasMatchingValue link.
Figure 26:
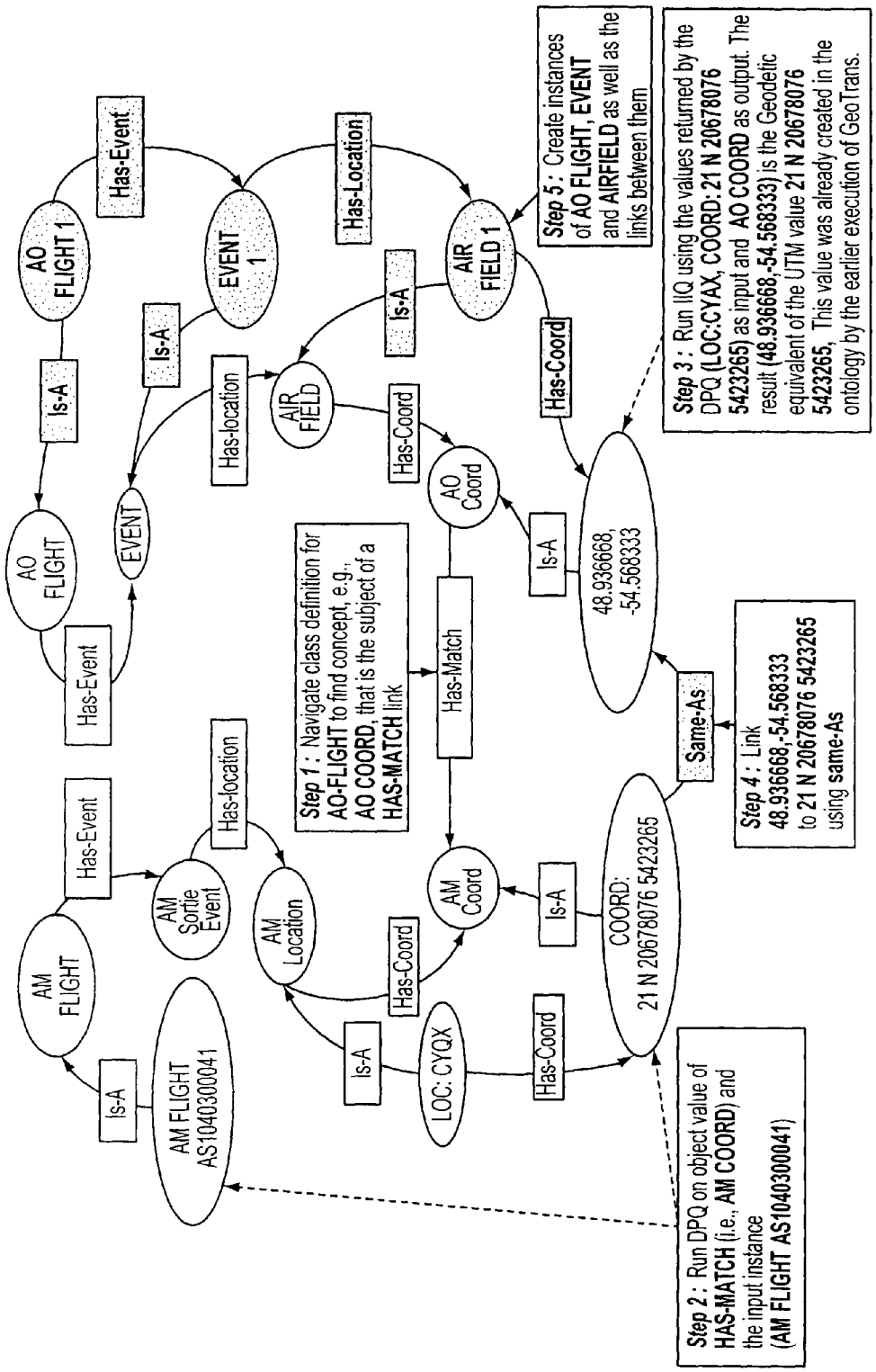
FIG. 26 is a schematic diagram outlining the creation of new data instance on the AO information system ontology using the hasMatch link.

Once these workflows are executed, the algorithm presented in FIG. 24 creates a new data instance in AO domain. This new instance is then linked to the AM instance AM FLIGHT AS1040300041 using the is CorrelatedWith link and imported to the ontology management service. To help the reader understand this algorithm, notional representations of the processing for the hasMatchingValue and hasMatch relationships are depicted in FIG. 25 and FIG. 26, respectively.

In the above examples, a single input data instance on the AM information system was input into the Semantic Viewer, and a single corresponding data instance in the AO information system was created. The algorithms of the present invention may be generalized to return multiple initial workflows that corresponding to multiple, input data instances.

Figure 27:
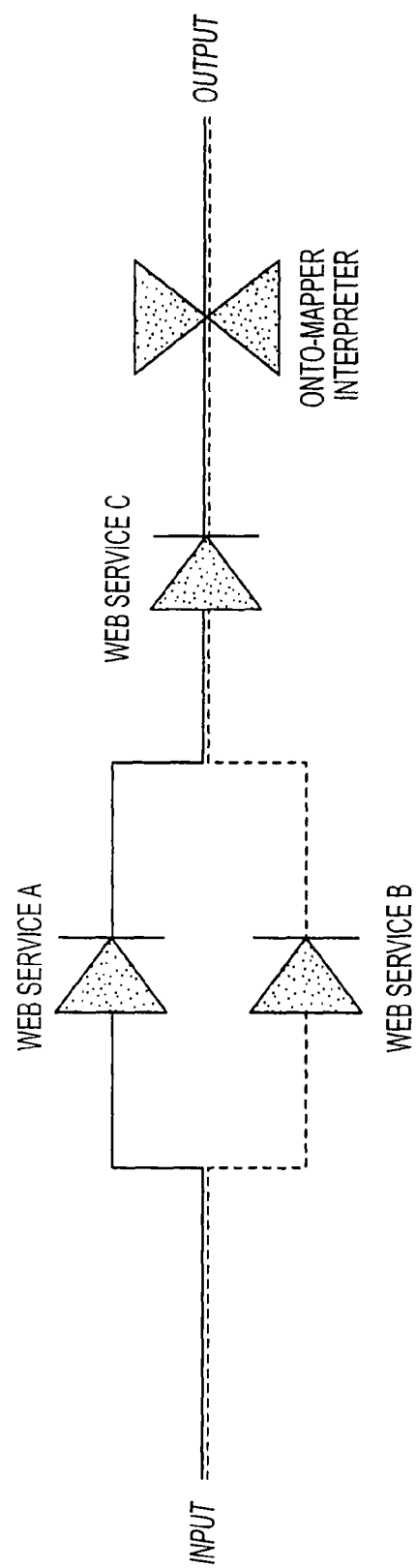
FIG. 27 is an example of a generalized execution path containing multiple workflows.

FIG. 27 illustrates a case in which the outputs from the execution of multiple web services serve as necessary inputs to future chained web services. In FIG. 27, the first workflow is composed of the sequenced web service A, followed web service C, and finally followed by the Onto-Mapper. The execution of A succeeds and its result is stored in the ontology management system. However, the execution of C fails, since the output of web service B is needed as input to web service C. The system proceeds to execute the second workflow, i.e., web service B, followed web service C, and finally followed by the Onto-Mapper. This workflow successfully completes since the necessary output from A was stored and is currently available.

The present approach, as described by the above example, is also extensible. The previous examples concentrate on the mapping of a number of information system ontologies to a number of context ontologies of a fixed size. The invention also allows the incorporation of new context ontologies and the extension of existing context ontologies without any modification to existing mappings. In this fashion, a given context ontology may be extended to account for conceptual representations in a larger number of existing information systems. Further, new context ontologies and mappings may be created to embrace additional enterprise concepts without modifying the mapping of existing context ontologies to information systems.

Example 3

Integrating Disparate Web Services or Web Sites Using a Semantic Web Scripting Language (SWSL)

The following example illustrates a method and a scripting paradigm for automatically integrating disparate information systems (e.g., web services and web sites) within a given enterprise using a service-oriented architecture. The approach builds upon the semantic framework outlined in Examples 1 and 2, in which a new web service enables information exchange between two or more disparate information systems, web services, or databases. The newly-developed web service may be associated with a corresponding new data model, or schema, that serves to harmonize the various data models involved in the information exchange. To facilitate the transfer of information, the basic concepts contained within data models of the disparate information systems, web services, and databases must be migrated and persisted in the new data model. The embodiments below describe how the method and the scripting paradigm automatically derive the new data model and associated ontological structures and achieves the integration of web services or web sites that integrate the disparate information systems.

As an alternative to the scripting paradigm of the semantic web scripting language (SWSL), the newly-developed web service that achieves the integration can be automatically generated in the form of C# code from the WSDL files of the legacy web services, from pairwise mappings between the WSDL files, and from mappings between the WSDL files and one or more shared contexts. In the following example, context signifies any web service and its associated WSDL that is able to bridge differences between entities in the legacy schemas. The automatically-generated C# code is associated with an automatically generated information system ontology which is mapped to information system ontologies of the web services in the information flow and to context ontologies.

Figure 28:
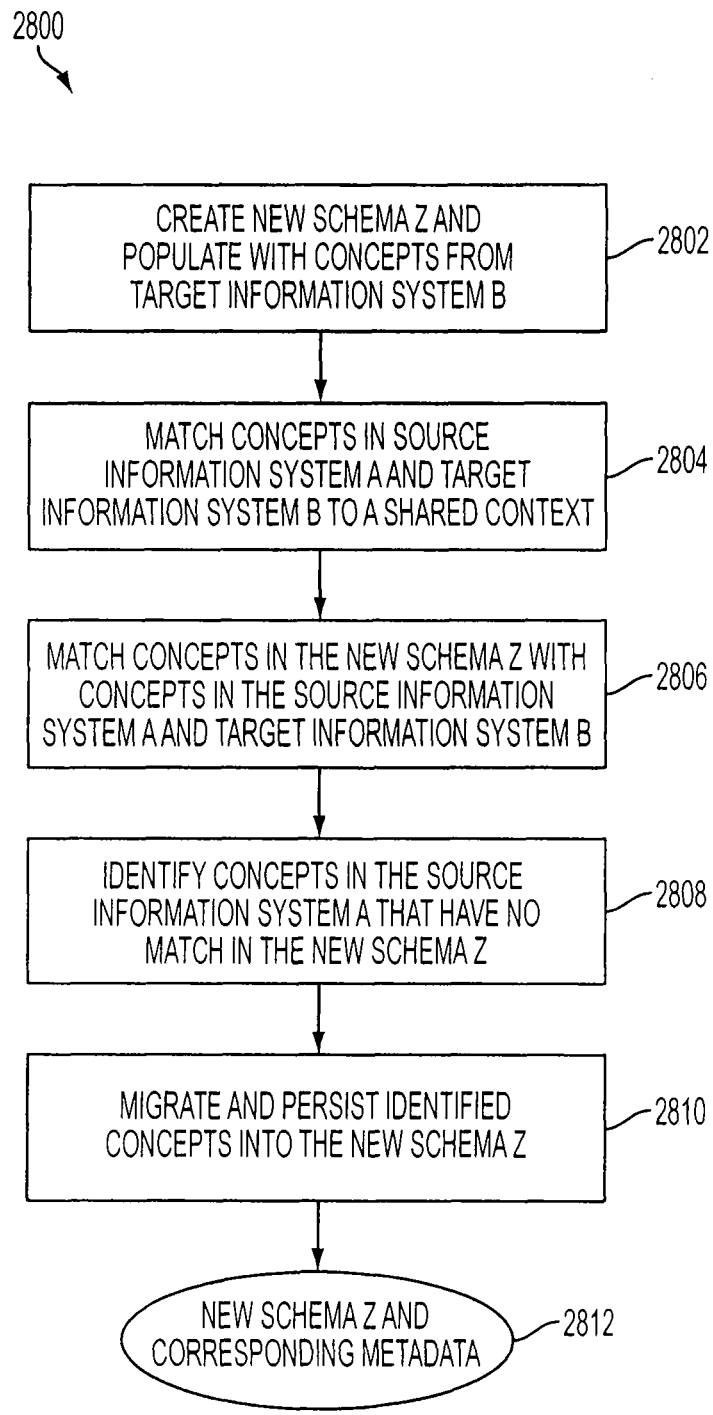
FIG. 28 is a detailed flow diagram of an exemplary method for automatically deriving a new data model that facilitates the exchange of information between disparate information systems.

FIG. 28 is a detailed flow diagram of a method 2800 for automatically deriving a new data model that facilitates the exchange of information between a target information system A and a source information system B. A number of ubiquitous concepts (e.g. time, position, etc.) characterize the source and the target information systems, and these concepts may be contained within WSDL files that are specific to each information system. The information system ontologies may be built from the WSDL or SAWSDL, and OWL/RDF relations and may be represented as a uniform structure of triples. Although the concepts characterizing each information system may be similar, significant distinctions may exist in the semantics, representation, and terminology of these concepts on the respective information systems.

Within FIG. 28, the new data model, schema Z, is created in step 2802 and subsequently populated with the concepts that characterize the target information system B. Then, in step 2804, the concepts within the target information system A and the concepts within the source information system B are mapped to a shared context. The concepts within the newly-populated schema Z are then mapped in step 2806 to the concepts within the source information system A to identify conceptual matches between the source information system A and the newly-populated schema Z, and to the concepts within the target information system B to identify conceptual matches between the target information system BA and the newly-populated schema Z.

The matching process proceeds by asserting a number of OWL/RDF mapping relations, or simply mapping relations, to map concepts within the newly-populated schema Z to associated concepts within the source information system A. An appropriate set of OWL/RDF mapping relations are used to reconcile syntactic, structural, and representational mismatches between the concepts. The appropriate OWL/RDF mappings have been described in Table 8 of Example 2. For example, these mapping relations may be captured in an Excel worksheet, in which case, they become mapping relations rather than OWL/RDF mapping relations.

For example, the newly-populated schema Z may include a concept called time, and an associated concept within the source information system A may be called starttime. If time and starttime are identical from a semantic and a representational perspective, then the value of A::starttime may be directly assigned to Z::time. The following OWL/RDF mapping relation may then be asserted to perform the assignment:

A:: starttime has-matchingvalue Z:: time.

Alternatively, the time concept may be a semantic match with the starttime concept, except the representation of the time concept may differ significantly from the representation of the starttime concept. For example, the new schema Z may express time using the Zulu time zone format, while target information system A may express starttime in the Eastern time zone format. In such a case, the following OWL/RDF relations may specify the representational details of the respective concepts:

A:: starttime has-context Eastern-time-zone; and

Z:: time has-context Zulu-time-zone-format.

The following OWL/RDF mapping then indicates that the representation of A::start time must be reconciled with the representation of Z::time before being assigned to Z::time:

A:: starttime has-match Z:: time.

Further, terminological mismatches may also be identified between concepts that are identical from a semantic and a representational perspective. In such a case, the following OWL/RDF mapping relation may be asserted to resolve a terminological mismatch between A::starttime and Z::time:

A:: starttime owl::sameAs Z:: time.

Once the concepts within new schema Z are mapped to the concepts in the source information system A, the source information system A is scanned in step 2808 to identify concepts that have no corresponding match in the new schema Z, but are needed to be included in schema Z. These identified concepts must then be migrated into and persisted in the new schema Z within step 2810. For each identified concept within source information system A, a corresponding new concept is created within the new schema Z. The new concepts in schema Z are then mapped to the corresponding identified concept in the source information system A by asserting the OWL/RDF relation has-matchingvalue.

Steps 2806, 2808, and 2810 generate the new schema Z and its corresponding metadata, and this new schema is output in step 2810. The set of mapping relations used to define new schema Z may be captured by a script writer in text format, in a Microsoft Excel document, in HTML, or in any other appropriate format for later use. Further, the process described by FIG. 28 is not limited to a single source information system and a single target information system. The present invention may link any number of source information systems, databases, or web services to any number of target information systems, databases, or web services using the new schema, Z.

Figure 29:
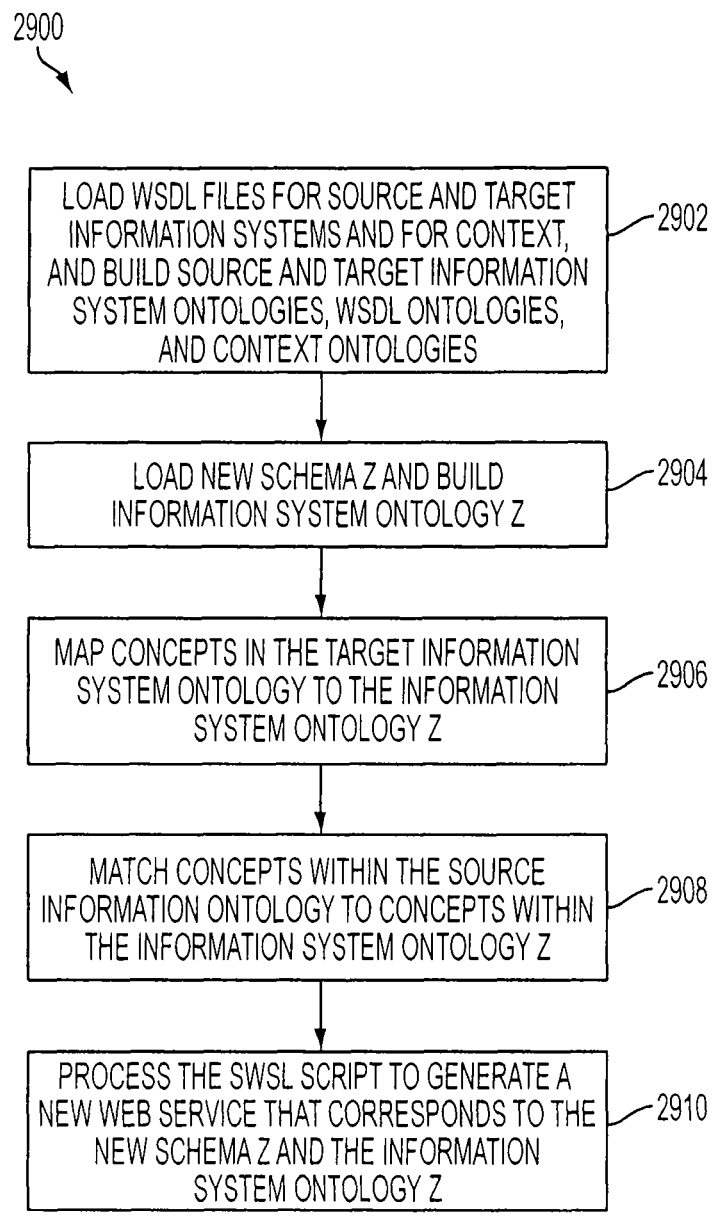
FIG. 29 is a detailed flow diagram of an exemplary method for automatically deriving information system ontologies and mappings that facilitate the integration of disparate information systems.

FIG. 29 is a detailed flow diagram of an exemplary method 2900 for automatically developing a new web service that integrates disparate information systems in accordance with the present invention. In step 2902, WSDL files that correspond to each of the disparate web services or web sites are loaded into memory, and an equivalent ontological representation, known as a WSDL ontology, is created for each WSDL file. From the WSDL files, the information system ontologies are also created. Thus, for source information system A and target information system B, step 2902 loads the respective source and target WSDL files and generates the respective source WSDL and information system ontologies and target WSDL and information system ontologies. Additionally, mapping relations or links are created between concepts in the source WSDL ontology and source information system ontology. Similarly, mapping relations or links are created between concepts in the target WSDL ontology and the target information system ontology. The mappings between the WSDL ontology and the information system ontology may be performed using the mapping relations of Table 7 above.

Additionally, step 2902 loads contexts from WSDL files of translator services, and generates a corresponding set of context ontologies, such as a position context ontology associated with a position translator and a time context ontology associated with a time translator.

Alternatively, a semantically-annotated WSDL file (SAW-SDL) may be loaded in step 2902 for each of the disparate information systems, and corresponding information system ontologies may be created from the SAWSDL files. The resulting information system ontology may correspond to the "type" section of an associated WSDL file, but with the annotating concepts of the SAWSDL file replacing the annotated XML elements in the WSDL file. Additionally, a mapping relation or a link is created between the annotating concept in the SAWSDL ontology and the annotated concept in a corresponding information system ontology.

Once the source and the target WSDL ontologies, context ontologies, and information system ontologies have been created, a new schema Z and a set of OWL/RDF mappings that define the new schema Z are loaded into memory in step 2904, and a corresponding information system ontology Z is built. In a preferred embodiment, the new schema Z may be defined using the techniques described in FIG. 28. Alternatively, the new schema Z may be derived from any alternative technique that provides a set of appropriate OWL/RDF mappings relations.

The information system ontology Z contains concepts from the target information system ontology. In step 2906, each concept within the target information system ontology may be mapped to the corresponding concept in the information system ontology Z by asserting an appropriate mapping relation, such has-matchingvalue or owl:equivalentClass, or an appropriate hasMatch relation between the concepts. Alternatively, the mapping process within step 2906 may assert a different mapping relation between the concepts, or the mapping process may not assert any relation between the concepts. The process by which these relations are chosen and mapped is described below in reference to FIG. 33 and FIG. 34, and variations in these processes are possible without departing from the spirit and scope of the present invention.

The concepts that characterize the information system ontology Z are subsequently matched in step 2908 to concepts that characterize the source information system ontology. The matching process within step 2908 utilizes the set of OWL/RDF mappings that define the new schema Z and that were loaded with the new schema Z in step 2904. Thus, for each OWL/RDF mapping relation within the new schema Z (e.g., A:: starttime has-matchingvalue Z:: time), an identical relation is asserted between the corresponding pair of concepts in the source information system ontology and the information system ontology Z.

The matching process within step 2908 also increases the amount of data within the information system ontology Z, as the information system ontology Z stores a set of mappings that link the information system ontology Z with both the source and target information system ontologies. Thus, the resulting information system ontology contains more information than was originally present within the source and target information system ontologies. Further, upon completion of step 2908, the information system ontology Z is correctly mapped to both the source information system ontology and the target information system ontology. As these source and target information system ontologies have been previously mapped to their associated context ontologies using the process described in Example 2, the information system ontology is also correctly mapped to the set of context ontologies.

In step 2910, a web service and a corresponding WSDL/SAWSDL file is generated for the new schema Z from the corresponding information system ontology Z and from the context ontologies to which the information ontology Z is mapped. The web service also implements the workflow specified in the SWSL script. By creating an appropriate web service description file (WSDL) of the new schema, the web service may be invoked to broker information requests between the source and target information system and to facilitate data interoperability between the source and target information systems.

Although described in terms of a single source and target information system, the process outlined in FIG. 29 may integrate multiple source and multiple target information systems using a single, additional web service. Further, the present invention may incorporate any of a number of information systems, including a variety of web services (e.g., web sites) and a variety of structured databases abstracted by web services.

In general, data modelers design the new schema Z and information system ontology, and programmers generate the source code that implements the new web service that expose the data. The source code is often compiled and executed using specific software and hardware components after a community-of-interest has agreed on the shared vocabulary described in the data model and the information system ontologies. Further, the technical knowledge required to develop and execute the source code may not be universally held throughout the community-of-interest, resulting in a significant disconnect between those with the greatest knowledge of the individual information systems and those that integrate the information systems. Thus, the integration process outlined within FIG. 28 and FIG. 29, if done manually, may not operate efficiently, as the community-of-interest must first develop a shared vocabulary before the programmer can begin the implementation of the web services that integrate the information systems.

An additional embodiment of the present invention is a new scripting paradigm, a Semantic Web Scripting Language (SWSL), that allows a script writer to achieve the integration of web services and web sites and automatically build the shared vocabulary consisting of information system ontologies, mappings, and context ontologies. SWSL is built upon existing, open-source web-scripting languages, such a JScript, VBScript, and Ruby, and SWSL scripts combine these scripting languages with HTML and metadata and may be executed using a web browser (or alternatively, an appropriate server). By abstracting mediation and workflow composition, and requiring only knowledge of basic scripting languages and a web browser, the use of SWSL as a scripting paradigm encourages mass participation in the integration process.

FIG. 30 is an exemplary SWSL script that specifies the steps necessary to integrate two disparate information systems, the Mobility Air Force Command (MAF) and the Combat Air Force Command (CAF), within the Department of Defense enterprise. Each information system is abstracted by a web service, which is characterized by a data model, and each respective data model incorporates the ubiquitous concepts that characterize each respective information system. The data model and concepts that characterize each respective web service may be incorporated into a corresponding WSDL file.

The exemplary SWSL script of FIG. 30 is comprised of five major blocks, along with the necessary initialization and steps. The exemplary SWSL script first imports context ontologies or context WSDLs that bridge mismatches between entities or attributes in the legacy systems involved in the information flow. The exemplary SWSL script could additionally import any number of context ontologies or context WSDLs that would be relevant to the disparate information systems. Furthermore a SWSL script may import other SWSL scripts.

The exemplary SWSL script then imports WSDL files for each of the disparate web services or web sites that are subject to integration. The WSDL importation block loads WSDL files that correspond to the MAF system (maf.wsdl) and the CAF system (caf.wsdl). These WSDL files incorporate the concepts and the data models that characterize each respective information system, and these WSDL files are used to build corresponding WSDL ontologies and information system ontologies, including a MAF WSDL ontology, a MAF information system ontology, a CAF information system ontology, and a CAF WSDL ontology.

Once the necessary WSDL files and the necessary context ontologies have been loaded into memory, the exemplary script then aligns the concepts that characterize the MAF and the CAF systems. The alignment block derives a new schema by mapping concepts in the MAF information system ontology to concepts in the CAF information system ontology using a set of OWL/RDF relations, as was described above in reference to FIG. 28. The alignment block may also result in changes to the information system ontologies and to the context ontologies.

Within the alignment block, has-matchingValue is asserted with arguments maf-callsign and caf-callsign, thus indicating that maf-callsign concept and the caf-callsign concept are identical from a semantic and representational perspective. Accordingly, the value of maf-callsign may be immediately assigned to caf-callsign within the new schema. Additionally, the assertion of has-match with arguments maf-time and caf-time indicates that the concepts are semantically equivalent, but different in representation. As such, the representational differences between these concepts must be resolved before the value of maf-time may be assigned to the value of caf-time. For example, maf-time has-context Zulu time zone, and caftime has-context ET-time-zone are asserted to reconcile representational mismatch. Further, by asserting the owl::sameAs relation, the exemplary SWSL script indicates that the Landing and ARR concepts exhibit a terminological mismatch while being identical from a representational and a semantic perspective.

The mapping operations within the alignment block in the SWSL script effect the mappings between the information system ontologies of the source and target system and help derive the new schema by defining the semantic, representational, and terminological matches between the concepts of the new schema and the concepts of the MAF and CAF information system ontologies. The newly-generated schema also forms the basis for a new information system ontology and a corresponding web service that integrate the MAP and CAF information systems. The processing of the alignment block may also result in changes to the MAF and CAF information system ontologies.

The exemplary SWSL script then orchestrates workflows from the MAF web service to the CAF web service through the newly created web service. In SWSL the workflows are specified using the "Step" functionality of SWSL. As an alternative to expressing the workflow in scripting, the workflow can be expressed in HTML. The set of OWL/RDF mappings that define the new schema Z are used to establish similar mappings between the information system ontology Z, the MAF information system ontology, and the CAF information system ontology, as was described above in reference to FIG. 29. These mappings then serve to reconcile syntactic, structural, and representational mismatches between the MAF and the CAF.

Once workflows between concepts in the respective WSDL ontologies have been orchestrated, any remaining terminological, semantic, and representational mismatches are resolved within the mediation block. The resulting information system ontology incorporates the concepts from the information system and context ontologies, as well as the set of mappings between concepts in the MAF and CAF information system ontologies. As such, the resulting information system ontology may contain more data than is contained within the WSDL ontologies. Further, a web service and corresponding WSDL file or SAWSDL file may be created for the new information system ontology.

FIG. 31 is a second exemplary SWSL script that specifies the steps necessary to integrate two disparate information systems, the Mobility Air Force Command (MAF) and the Combat Air Force Command (CAF), within the Department of Defense enterprise. As was discussed in reference FIG. 30, each information system is abstracted by a web service, which is characterized by a data model, and each respective data model incorporates the ubiquitous concepts that characterize each respective information system.

The essential components of the exemplary SWSL script of FIG. 31 are functionally identical to those outlined in regards to the exemplary script of FIG. 30. However, the exemplary script of FIG. 31 employs HTML to align the concepts that characterize the MAF and the CAF information systems and to derive a new schema by mapping concepts within the MAF and CAF information system ontologies using a set of mapping relations.

The exemplary SWSL script first imports the data models and the concepts that characterize the web services of the respective MAF and CAF information systems. In the embodiment of FIG. 31, the data models and concepts are obtained by loading either WSDL files of the MAF and CAF services or information system ontologies for each of the respective MAF and CAF information systems. The exemplary SWSL script then loads context ontologies, or context WSDLs, that describe the various representations of position and time across the MAF and CAF enterprises. The information system ontologies and the context ontologies may be built from OWL/RDF relations and may be represented as a uniform structure of triples in a fashion similar to that outlined in Examples 1 and 2. Further, although described only in terms of the time and position context ontologies, the exemplary SWSL script of FIG. 31 may import any number of context ontologies, schemas, or WSDL files that would be relevant to the information systems subject to integration.

Alternatively, the exemplary SWSL script may obtain the data models and concepts by loading a WSDL file for each of the disparate web services and web sites that are subject to integration. These WSDL files incorporate the concepts and the data models that characterize the respective MAF and CAF information systems, and these WSDL files could then be used to build corresponding WSDL ontologies and information system ontologies, including a MAF WSDL ontology, a MAF information system ontology, a CAF information system ontology, and a CAF WSDL ontology. Also alternative to loading context ontologies, one can load WSDL files of translator services that are needed to be invoked by the mediator ontomapper.

In additional embodiments, the exemplary SWSL script may obtain the necessary data models and concepts by loading a .SWSL script file for each of the disparate web services and web sites that are subject to integration. Further, although not described within the embodiment of FIG. 31, the exemplary SWSL script may import any number of previously-defined SWSL scripts.

The exemplary SWSL script of FIG. 31 employs HTML to import the data models and concepts that characterize the MAF and the CAF information systems. As such, the exemplary SWSL script may be run using a conventional web browser. Alternatively, the exemplary SWSL script could employ existing, open-source web-scripting languages, such as Jscript, VBScript, and Ruby, to load the necessary schema, ontological structures, and WSDL files. In such a case, the resulting SWSL script could be executed using an appropriate server. In additional embodiments, the exemplary SWSL script could employ any combination of HTML code and web scripting languages to import the data models and concepts that characterize the respective MAF and CAF information systems.

Once the necessary data models and concepts have been loaded into memory, the concepts that characterize the individual MAF and CAF information systems are aligned by the exemplary SWSL script within an alignment block. The alignment block derives a new schema by mapping concepts in the MAF information system to concepts in the CAF information system ontology, and by mappings these concepts to one or more shared contexts using a set of mapping relations, as was described above in reference to FIG. 28.

The exemplary SWSL script of FIG. 31 employs HTML tags to define mappings between concepts in the respective MAF and CAF information systems using a set of mapping relations, and the exemplary alignment block of FIG. 31 employs the owl:equivalentClass relation to define semantic and representational matches between concepts in the MAF and CAF information system ontologies (the relation is equivalent to the has-matchingvalue relation described above in reference to Example 2).

For example, the inclusion of the maf-callsign concept and the caf-callsign concept within the tag for the owl-equivalentClass relation indicates that these concepts are identical from a semantic and representational perspective, and accordingly, the value of maf-callsign may be immediately assigned to caf-callsign within the new schema. A similar semantic and representational relationship exists between the maf-eventStartTime concept and the caf-eventTime concept and between the maf-taskunit concept and the caf-taskunit concept, and the value of each respective MAF concepts may be immediately assigned to the corresponding CAF concept within the new schema.

The operations within the exemplary alignment block of FIG. 31 effect the mappings between the MAF and CAF information system ontologies and help derive the new schema by defining the semantic, representational, and terminological matches between the concepts of the new schema and the concepts of the MAF and CAF information system ontologies. The newly-generated schema also forms the basis for new information system ontology and a corresponding web service that integrate the MAF and CAF information systems. The operations within the exemplary alignment block of FIG. 31 may also affect the MAF and CAF information system ontologies.

The exemplary SWSL script then orchestrates workflows from the MAF web service to the CAF web service through the newly created web service. In the exemplary SWSL script, the workflows are specified using the "Step" functionality of SWSL. As an alternative, the workflow could have been specified in HTML rather than in scripting. The set of mapping relations that define the generation of the new schema are used to establish similar mappings between the new information system ontology, the MAF information system ontology, and the CAF information system ontology, as was described above in reference to FIG. 29. These mappings then serve to reconcile syntactic, structural, and representational mismatches between the MAF and the CAF.

Once workflows between concepts in the respective MAF and CAF information system ontologies (or alternatively, between concepts in the respective WSDL ontologies) have been orchestrated, any remaining terminological, semantic, and representational mismatches are resolved within the mediation block. As an alternative, the mediation block could have been specified in HTML rather than in scripting. The resulting information system ontology incorporates the concepts from the information system and context ontologies, as well as the set of mappings between concepts in the MAF and CAF information system ontologies. As such, the resulting information system ontology may contain more data than is contained within the MAF and CAF information system ontologies (or alternatively, the respective WSDL ontologies). Further, a web service and corresponding WSDL file or SAWSDL file may be created for the new information system ontology.

The exemplary alignment block of the SWSL script of FIG. 31 has been described in terms of a single mapping operation, i.e., the mapping of concepts in the MAF and CAF information systems using the owl:equivalentClass relation. In additional embodiments, the exemplary alignment block of FIG. 31 may map concepts from the MAF and CAF information system ontologies using any number of mapping relations and their corresponding definitions in HTML. FIGS. 32(*a*) through 32(*e*) illustrate portions of an exemplary alignment block that employ HTML to map together concepts within the MAF and CAF information systems using a number of appropriate mapping relations.

FIG. 32(a) illustrates an exemplary HTML that employs owl-sameAs to map concepts within the MAF information system ontology to concepts within the CAF information system ontology. The owl-sameAs relation indicates that two concepts are identical from a semantic perspective, but exhibit a terminological mismatch. For example, the use of owl-sameAs relation in FIG. 32(a) to map the MAF-F015 concept to the CAF-F15C concept indicates that, while these concepts are semantically equivalent, a terminological mismatch exists between the MAF-F015 concept and the CAF-F15C concept.

An exemplary HTML that maps concepts within the MAF and CAF information system ontologies using mappings-match is illustrated in FIG. 32(b). The mappings-match relation is equivalent to the hasMatch relation described above in reference to Example 2, and the mappings-match relation indicates that two concepts are semantically identical, but have different representations on the disparate information system ontologies. In FIG. 32(b), the mappings-match relation indicates that the maf-coord concept and the caf-coord concepts are semantically identical, but have different a representation on the respective MAF and CAF information system. For example, the maf-coord concept on the MAF information system may be represented by the Eastern time zone, while the caf-coord concept on the CAF information system may be represented by the military Zulu time zone.

In FIG. 32(c), an exemplary portion of HTML employs mappings-hasContext to specify a contextual relationship between a concept within the information system ontology and a concept within the shared context ontology. In the example of FIG. 32(c), the mappings-hasContext relation specifies that a contextual relationship exists between the caf-coord concept and the Coord-GEODETIC-WGE concept within the position context ontology.

FIG. 32(d) illustrates an exemplary portion of HTML that employs mappings-hasRelation to specify a generic relation between a pair of concepts within the same ontology or existing in different ontologies. In the example of FIG. 32(d), the use of the mappings-hasRelation relation specifies that a generic relationship exists between the coord-UTM-WGE concept and the WGE concept within the position context ontology.

The exemplary portion of HTML within FIG. 32(e) employs rdfs-subclassOf to indicate that one concept in an ontology is an instance of (or a subclass of) a second concept within the same or a different ontology. In the example of FIG. 32(e), the assertion of the rdfs-subclassOf relation specifies that the MA-B052H concept is an instance of the MAF-AircraftType concept within the MAF information system ontology. In a similar fashion, the CAF-F015 concept within the CAF information system ontology is a subclass of the broader caf-AircraftType concept within the CAF information system ontology.

The exemplary portions of the SWSL alignment block presented within FIGS. 32(a)-32(e) employ HTML to align concepts within the MAF and CAF information system ontologies, and as such, these exemplary portions can run in a conventional web browser. In alternate embodiments, the various portions of the SWSL alignment block may be implemented in using any of a number of open-source web-scripting languages, such as JScript, VBScript, and Ruby, or through the use of any combination of web-scripting languages and HTML coding that would be apparent to one skilled in the art.

SWSL scripts, such as the exemplary scripts of FIGS. 30 and 31, facilitate the development of information system ontologies that link disparate data models using mappings between the disparate data models. Thus, SWSL scripts may serve the additional purpose of indexing and retrieving previously generated data models, as each SWSL script contains not only a new data model, but also existing data models that the newly-generated data model serves to integrate.

Further, since SWSL scripts also reference context ontologies, or contexts, and the mappings of data models to them, each of the referenced context ontologies can serve as a specialized index. For example, the "time" and "position" context ontologies from the exemplary scripts of FIGS. 30 and 31 can serve as time and position indices. The indexing properties of SWSL scripts may capture important metrics such as the number of mappings that connect a SWSL script to one or more context ontologies, or context, the number of mappings that connect two or more data models, and the designation of the newly generated data models from the SWSL script. Data models may also be discovered by querying the context ontology indices, and these queries may identify data models that have the links to specific context ontologies and data models that correspond to SWSL scripts with links to other designated data models.

Unlike established programming languages such as C or Pascal, the SWSL scripting paradigm does not explicitly embrace "strong typing." However, the SWSL may support a number of object types, including:

Input Parameter Type; Output Parameter Type; Web Service Type; Input Object Type; Output Object Type; Onto Mapper Type; Method Name Type; Composite Type; Complex Type; Instance Value Type; and Tag Type.

By embracing "weak typing," SWSL scripts hide the above object types from the script writer, and the SWSL interpreter engine converts the data types in the SWSL script into the appropriate object types described above. However, the selection of the scripting language upon which the scripting paradigm is build dictates the handling of SWSL data types, and the present invention is not limited to the object types and to the "weak typing" standard described above.

The SWSL scripting paradigm also provides a script writer the ability to write scripts that incorporate both concepts and metadata. SWSL scripts may define an instance of a concept within the script, and the resulting script may treat an instance of a concept as a specified, assignable value. Further, SWSL scripts may support the specialization of a concept with a restriction (e.g., restrict the concept "Geodetic" with a specified datum). SWSL scripts, when incorporating metadata, may provide the script writer the ability to tag an XML element or attribute with a concept and the facility to load an XML element with its tag value from the SAWSDL file.

In addition, SWSL scripts may provide a script writer the option of importing previously-developed context ontologies (e.g., time, position, units of measure, etc.), and these imported ontologies may be represented as context modules with one or more associated web services. SWSL scripts may additionally associate an imported context with a particular concept or a variable. Furthermore, SWSL script may import existing or other SWSL scripts.

Figure 33:
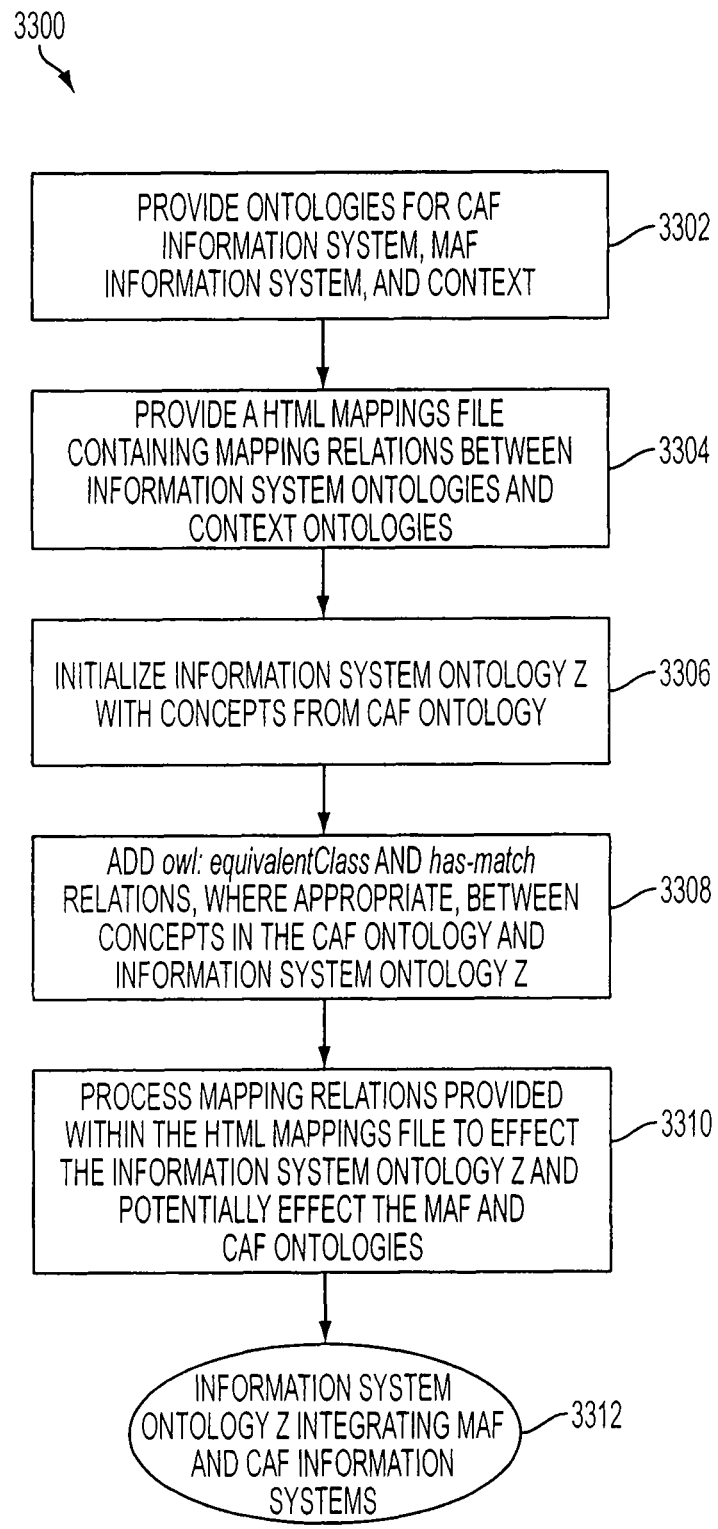
FIG. 33 is a detailed flow diagram of an exemplary method for automatically generating ontological structures necessary to integrate disparate information systems within the exemplary SWSL script of FIG. 31.

FIG. 33 is a detailed illustration of an exemplary method 3300 for automatically generating ontological structures necessary to integrate disparate information systems within the exemplary SWSL script of FIG. 31. A shared information system ontology Z may be automatically generated within FIG. 33 to integrate two disparate information systems, the Mobility Air Force Command (MAF) and the Combat Air Force Command (CAF), within the Department of Defense enterprise. The exemplary method of FIG. 33 leverages and expands upon the techniques for generating the information system ontology Z described above in reference to FIG. 29.

Within FIG. 33, step 3302 provides ontologies for the CAF and MAF information systems in OWL or RDF format. In one embodiment, at least one of the MAF and CAF ontologies may be generated from a corresponding WSDL file using a WSDL-to-OWL conversion tool or a custom-built conversion tool. In an additional embodiment, at least one of the MAF and CAF ontologies may be imported directly in OWL or RDF format using a SWSL script, such as the exemplary script of FIG. 31.

Step 3304 provides a HTML file, or the alignment block of the SWSL script, containing mapping relations that link concepts or classes within the CAF ontology, the MAF ontology, and any context ontology, such as the position and time context ontologies. The mapping relations within the HTML mapping file may be generated by a subject matter expert (SME) in the domain of integration, and in a preferred embodiment, the HTML mappings file may be imported by a script, such as the exemplary SWSL script described in FIG. 31. Further, the mapping relations within the SWSL file may incorporate a set of HTML alignment statements that are invoked within the exemplary SWSL script of FIG. 31.

Information system ontology Z is then initialized with the CAF ontology in step 3306. The initialization process may incorporate into the information system ontology Z those concepts and data models that characterize the CAF ontology In step 3308, a set of relations may be created between concepts or classes within the CAF ontology and corresponding concepts or classes within the information system ontology Z. Within step 3308, a number of owl:equivalentClass relations and has-match relations may be added to the information system ontology Z. The selection of a particular relation depends upon the structure of concepts within the CAF ontology (e.g., whether the concept is defined using triples and is not a leaf node) and mappings within the HTML mappings file (e.g., whether any mappings involve CAF concepts).

Once the concepts within the CAF ontology have been mapped to corresponding concepts within the information system ontology Z, mapping relations within the HTML mappings file, or the alignment block of the SWSL script, are added to the information system ontology Z in step 3310. Within step 3310, the exemplary method may incorporate any number of has-relation relations into the information system ontology Z. A particular has-relation relation may be identified from the HTML mappings file that links a concept A within an ontology X, X#A, to a second concept B within the same ontology, X#B. The ontology X may be the MAF ontology, the CAF ontology, or any of a number of context ontologies, such as the position or time context ontologies, that are relevant to the enterprise. A representation of concept A in the information system ontology Z, Z#A, may then be generated if it does not already exist, and a representation of concept B within the information system ontology Z, Z#B, may be generated if concept B exists within the MAF ontology. Once the various representations of concepts A and B have been generated in the information system ontology Z, the has-relation relation is then added to Z#A with respect to X#B in step 3310. In a similar fashion, the has-relation may be added to Z#B with respect to X#A. This process may be repeated for each has-relation relation within the HTML mappings file. In addition to the method described above, the has-relation relation can simply create a relation between X#A and X#B and persists it in X.

Owl-equivalentClass relations within the HTML mappings file may also be incorporated into the information system ontology Z within step 3310. In particular, an owl-equivalentClass relation may be identified that links a concept in the CAF ontology, CAF#A, with a concept in the MAF ontology, MAF#B. The owl:equivalentClass relation may then be added to Z#A with respect to both X#B and X#A, where Z#A has been previously generated using the techniques described above. This process may be repeated for each owl:equivalentClass relation within the HTML mappings file. In addition to the method described above the owl:equivalentClass may require further processing than that described above.

Further, a number of sub-class-of relations may be added to the information system ontology Z within step 3310. For each sub-class-of relations between X#A and X#B, a corresponding representation Z#A is created within the information system ontology Z. Alternatively, the representation Z#A may have been previously generated using the techniques described above. The rdfs:subClassOf relation may then be added to the Z#A with respect to X#B. In addition to the method described above, the rdfs:subClassOf can simply create a subclass relation between X#A and X#B and persist it in X.

A number of same-as relations may also be incorporated into the information system ontology Z within step 3310. For each same-as relation between a concept in the MAF ontology, MAF#A, and a concept in the CAF ontology, CAF#B, an owl:sameAs relation may be added to the information system ontology Z linking Z#A to Z#B. In a similar fashion, the owl:sameAs relation may be added to link Z#A to Z#B. In addition to the method described above, the same-as relation may create a relation between X#A and X#B and thus, may require further processing.

Using the techniques of step 3310, each mapping relation within the HTML mappings file, or the alignment block of the SWSL script, may be individually added to the information system ontology Z to map the information system ontology Z to both the MAF ontology and the CAF ontology. As the MAF and CAF ontologies have been previously mapped to their associated context ontologies using the process described in Example 2, the information system ontology is also correctly mapped to the set of context onto logies.

Figure 34:
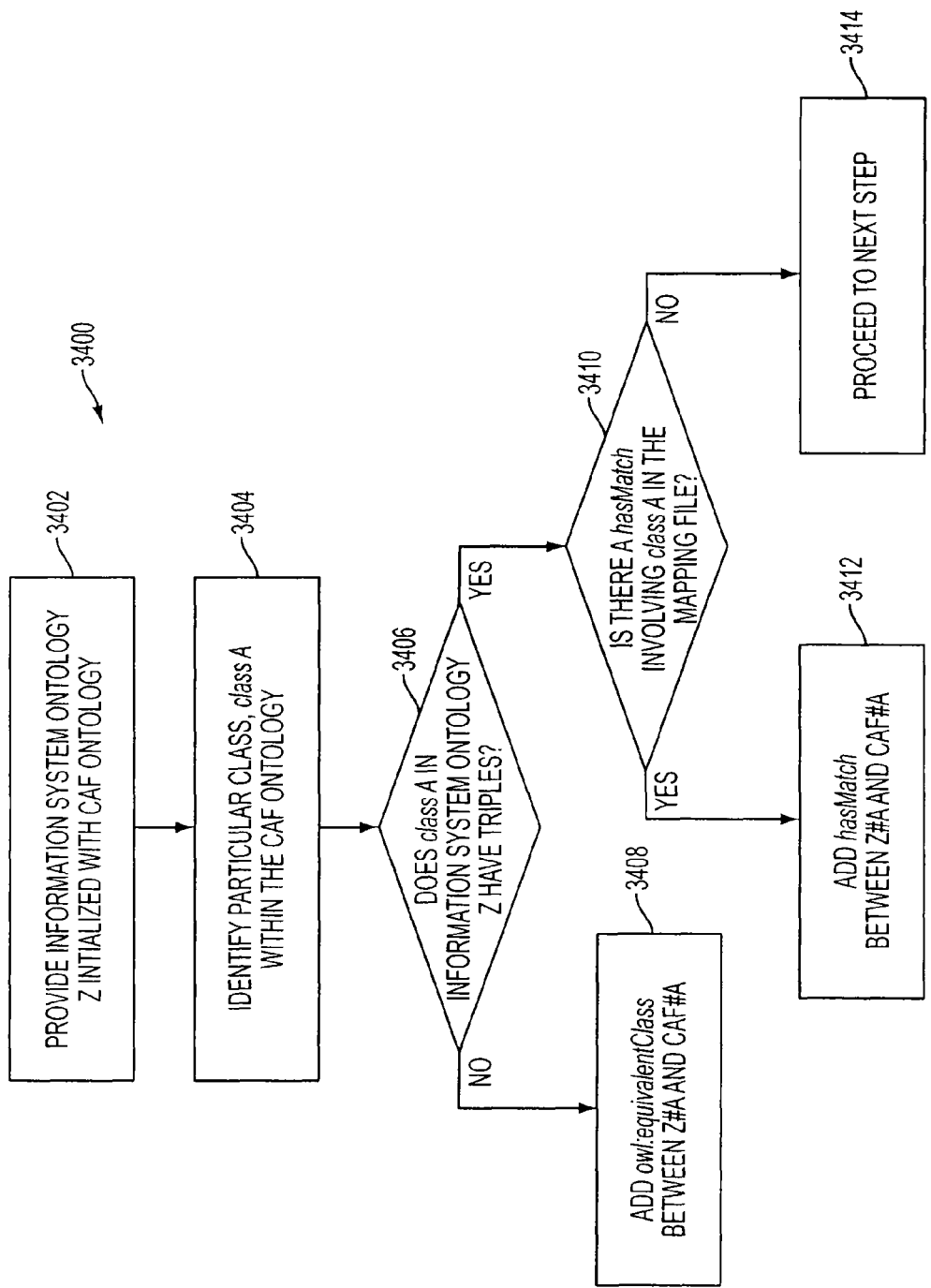
FIG. 34 is a detailed flow diagram of an exemplary method for generating a set of relations between concept ontologies that may be incorporated into step 3308 of the exemplary method of FIG. 33.

The mapped information system ontology Z that links MAF ontology, the CAF ontology, and the context ontologies is output in step 3312, and a web service and a corresponding WSDL/SAWSDL file may then be generated from the information system ontology Z and from the context ontologies to which the information ontology Z is mapped. By creating an appropriate web service description file (WSDL), the web service may be invoked to broker information requests between the source and target information system and to facilitate data interoperability between the MAF and CAF information systems FIG. 34 illustrates an exemplary method 3400 for generating a set of relations between concepts in a CAF ontology and an information system ontology Z that may be incorporated into step 3308 of the exemplary method of FIG. 33. Information system ontology Z is initialized with the concepts and classes of the CAF ontology within step 3402, and a particular concept or class within the CAF ontology, class A, is identified within step 3404. The identification of the particular concept within the CAF ontology is for exemplary purposes only, and the processes outlined in FIG. 34 may be applied to all concepts within the CAF ontology without departing from the spirit and scope of the present invention.

The identified concept, class A, within the CAF ontology may be represented within the ontology by a uniform structure of triples, and in step 3406, the exemplary method determines whether class A is defined using additional triples. If class A has no additional triples in its class definition, then class A is a leaf node, and the owl:equivalentClass relation is added to the information system ontology Z in step 3408 to link class A on the information system ontology Z with class A on the CAF ontology. Within FIG. 34, the representation of class A in the information system ontology Z is given by the notation Z#A, and the representation of class A in the CAF ontology is denoted by CAF#A.

If the definition of class A contains additional triples, then class A is not a leaf node, and the exemplary method then determines in step 3410 whether any has-match relations within the HTML mappings file involve class A. If the HTML mappings file includes a has-match relation involving class A, then the has-match relation is added to Z#A with respect to CAF#A in step 3412, and the owl:equivalentClass relation is not asserted.

If, however, the exemplary method determines in step 3410 that no has-match relation in the HTML mappings file involve class A, then neither owl:equivalentClass relation nor the has-match relation is added is Z#A with respect to CAF#A in step 3414. In this case, no relation is created between the various representations of class A on the CAF ontology and the information system Z ontology.

Figure 35:
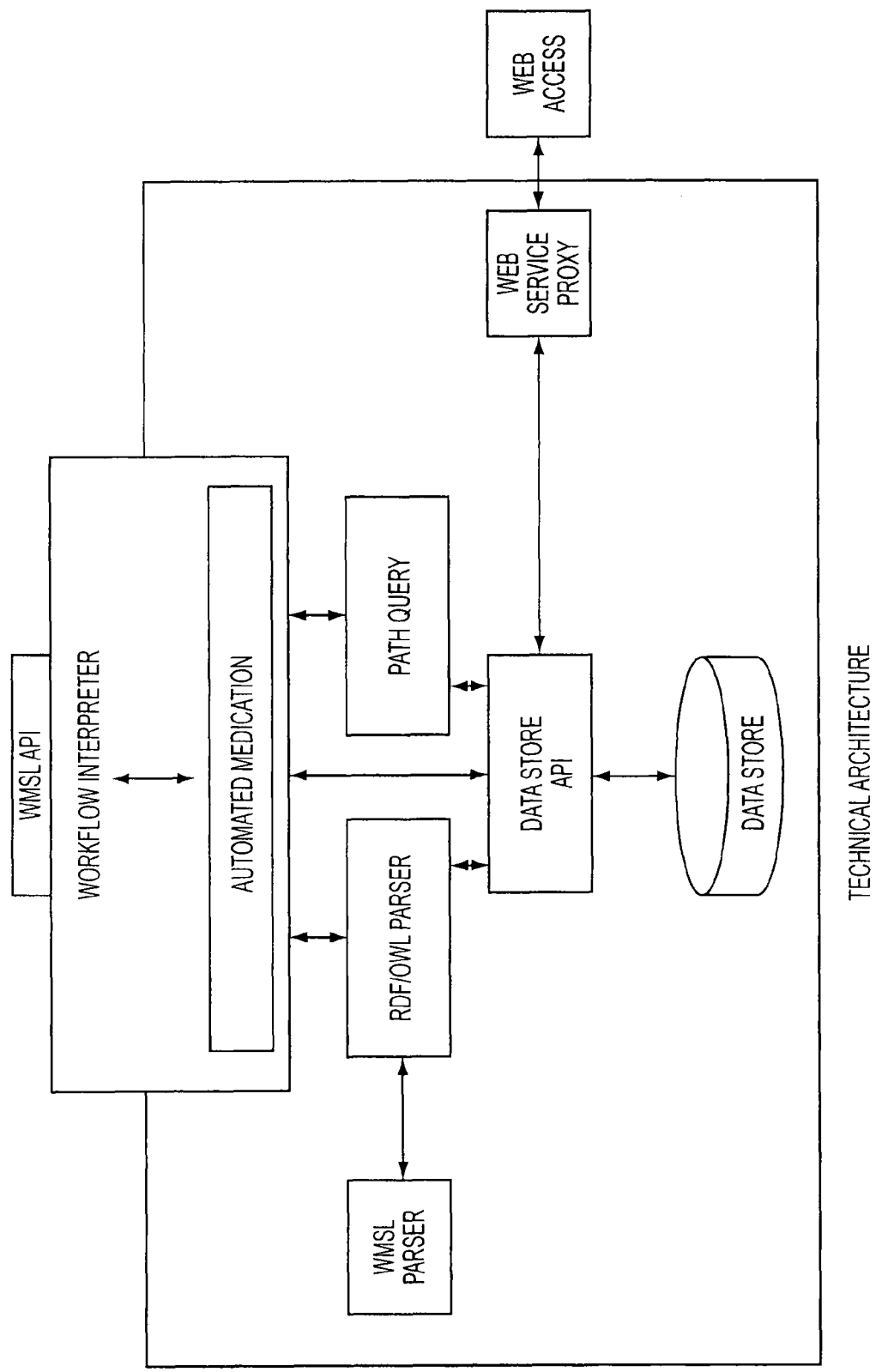
FIG. 35 illustrates a structure of the exemplary scripts of FIGS. 30 and 31.

FIG. 35 illustrates a structure of the exemplary scripts described above with reference to FIGS. 30 and 31. In one embodiment, the structure may be implemented in JavaScript, which allows the exemplary structure to run in the Web user's browser, or alternatively, the structure may be implemented in HTML or any other appropriate scripting language.

In FIG. 35, a data store is implemented as an RDF repository. In one embodiment, the RDF repository provides facilities for import, export, and management of RDF/OWL files. Closely associated with the data store is an RDF/OWL parser that is used to import RDF/OWL files to the data store. A path query component implements graph traversal techniques that are used in various places in workflow composition. As described above, there are two types of querying: Direct Path Query (DPQ), and Incoming Intersection Query (IIQ). Both the DPQ and IIQ algorithms make use of RDF- and OWL-Lite inferences, as described below.

In one embodiment, the DPQ is given a list of input values and a desired output, the DPQ creates the set of all the direct paths that lead to the desired output concept from the input concepts. In an additional embodiment, the IIQ is also given a list of input values and a desired output, and the IIQ performs a series of DPQs in the following manner. First, the algorithm uses a DPQ to create the set of all the direct paths, starting from any node in the graph, that lead to the desired output concept. Second, for each input value, the algorithm uses a DPQ to create the set of direct paths, starting from any node in the graph, that lead to that input value. Third, the algorithm returns the intersection of these sets.

The WMSL parser takes as input an HTML page that contains the mapping relations and produces aligned ontologies. In one embodiment, the WMSL parser accomplishes the generation of the ontologies as follows:
1. For each of the WSDL file declared in the WMSL-profile, the WMSL parser creates an ontology describing the type information denoted in the type section of the WSDL file. The WMSL parser also creates the Web Service Upper Ontology and automatically links it to the previously mentioned ontology.
2. For each mapping relation in the WMSL document, the WMSL parser creates a corresponding relationship between the generated ontologies. If an entity is declared in the WMSL document, but is not present in the ontology (composed of the mapped ontolgies), the entity is created and inserted into the ontology along with the specified relation(s).

To accomplish the step (1) above, the WMSL parser builds the ontology by leveraging the semantics already existing in the WSDL file. First, mapping patterns between XML schema primitives and the OWL/RDF vocabulary are created. In an embodiment, class membership is derived from the XML schema sequence (xs: sequence) and from restrictions on properties from the minOccurs/maxOccurs attributes of the xs:sequence tag. Since XML schema does not contain property names, a generic relationship may be used in the RDF triple.

FIG. 35 also depicts a web service proxy that invokes a web service on the Web. In one embodiment, the web service proxy works in conjunction with a proxy server installed at an application server to invoke web services on the Web. This pattern is made necessary in order to overcome the security issues that can arise when invoking Web services from the Web browser. In the embodiment depicted in FIG. 35, a proxy server (not shown) is the only software infrastructure needed. The Web service proxy builds the appropriate URL that invokes a Web service, for example, by assigning the correct values to the Web service parameters for a ReST style service. After invoking the Web service, the Web service proxy translates the instance returned by the Web service into an RDF instance of the RDF schema generated from the service's WSDL. The Web service proxy subsequently stores the RDF instance in to the Data Store.

In FIG. 35, a mediator component translates the returned document of one web service into an instance that can be consumed by another Web service in the workflow. In one embodiment, the mediator accomplishes the translation by interpreting the mapping relations in the aligned ontology. Each of the components described above offers an interface which permits its invocation, an collectively, these interfaces enable the composition or the mashing up of Web services.

Exemplary Computer Architectures

Figure 36:
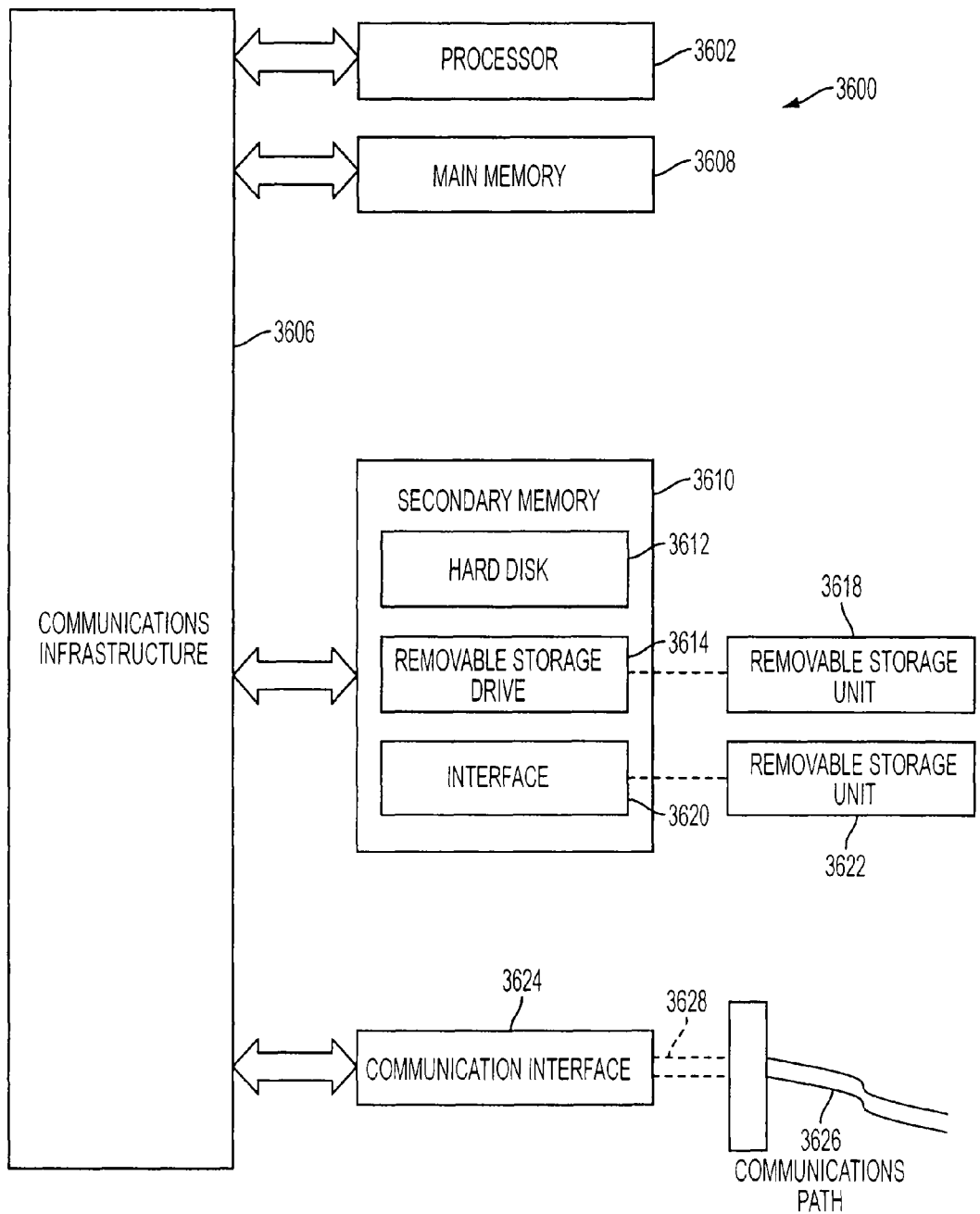
FIG. 36 is an exemplary computer architecture upon which the semantic system of the present invention may be implemented, according to an embodiment of the invention.

FIG. 36 is an exemplary computer architecture upon which the methods, systems, and computer program products of the present invention may be implemented, according to an embodiment of the invention. The exemplary computer system 3600 includes one or more processors, such as processor 3602. The processor 3602 is connected to a communication infrastructure 3606, such as a bus or network. Various example software implementations are described in terms of this exemplary computer system. After reading this description, it will become apparent to a person skilled in the relevant art how to implement the invention using other computer systems and/or computer architectures.

Computer system 3600 also includes a main memory 3608, preferably random access memory (RAM), and may include a secondary memory 3610. The secondary memory 3610 may include, for example, a hard disk drive 3612 and/or a removable storage drive 3614, representing a magnetic tape drive, an optical disk drive, CD/DVD drive, etc. The removable storage drive 3614 reads from and/or writes to a removable storage unit 3618 in a well-known manner. Removable storage unit 3618 represents a magnetic tape, optical disk, or other storage medium that is read by and written to by removable storage drive 3614. As will be appreciated, the removable storage unit 3618 can include a computer usable storage medium having stored therein computer software and/or data.

In alternative implementations, secondary memory 3610 may include other means for allowing computer programs or other instructions to be loaded into computer system 3600. Such means may include, for example, a removable storage unit 3622 and an interface 3620. An example of such means may include a removable memory chip (such as an EPROM, or PROM) and associated socket, or other removable storage units 3622 and interfaces 3620, which allow software and data to be transferred from the removable storage unit 3622 to computer system 3600.

Computer system 3600 may also include one or more communications interfaces, such as communications interface 3624. Communications interface 3624 allows software and data to be transferred between computer system 3600 and external devices. Examples of communications interface 3624 may include a modem, a network interface (such as an Ethernet card), a communications port, a PCMCIA slot and card, etc. Software and data transferred via communications interface 3624 are in the form of signals 3628, which may be electronic, electromagnetic, optical or other signals capable of being received by communications interface 3624. These signals 3628 are provided to communications interface 3624 via a communications path (i.e., channel) 3626. This channel 3626 carries signals 3628 and may be implemented using wire or cable, fiber optics, an RF link and other communications channels. In an embodiment of the invention, signals 3628 comprise data packets sent to processor 3602. Information representing processed packets can also be sent in the form of signals 3628 from processor 3602 through communications path 3626.

The terms "computer program medium" and "computer usable medium" are used to refer generally to media such as removable storage units 3618 and 3622, a hard disk installed in hard disk drive 3612, and signals 3628, which provide software to the computer system 3600.

Computer programs are stored in main memory 3608 and/or secondary memory 3610. Computer programs may also be received via communications interface 3624. Such computer programs, when executed, enable the computer system 3600 to implement the present invention as discussed herein. In particular, the computer programs, when executed, enable the processor 3602 to implement the present invention. Where the invention is implemented using software, the software may be stored in a computer program product and loaded into computer system 3600 using removable storage drive 3614, hard drive 3612 or communications interface 3624.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for automatically integrating data across disparate information systems, comprising:
    developing a first set of mapping relations that map entities in a source structured data model to corresponding entities in a target structured data model;
    developing a second set of mapping relations that map entities in the source structured data model and entities in the target structured data model to one or more shared contexts;
    processing the first and second sets of mapping relations to generate a new structured data model; and
    generating a web service comprising executable code that publishes the new structured data model to implement workflow between the source information system and the destination information system, the workflow comprising a path through a sequence of information systems processed by traversing through entities of the new structured data model to resolve an operation of the web service.

2. The method of claim 1, wherein the generating comprises:
    executing source information to retrieve an instance;
    translating the source instance into an instance that conforms to the new structured data model; and
    invoking a destination service to populate the instance conforming to the new structured data model.

3. The method of claim 2, wherein the translating comprises:
    invoking services corresponding to the shared context to mediate mismatches between entities in the source structured data model and entities in the target structured data model.

4. The method of claim 3, wherein the invoking comprises:
    mediating at least one of a structural mismatch, a syntactic mismatch, and a representational mismatch between entities in the source structured data model and entities in the target structured data model.

5. The method of claim 1, further comprising:
    capturing the first set of mapping relations and the second set of mapping relations in one or more of (i) text format, (ii) HTML format, and (iii) spreadsheet format.

6. The method of claim 1, further comprising:
    processing the first set of mapping relations and the second set of mapping relations to generate a schema.

7. The method of claim 1, wherein the source structured data model, the target structured data model, and the new structured data model are ontologies.

8. The method of claim 1, wherein the source information system and the target information system comprise any combination of a database and a web site.

9. A computer-readable storage device having computer program logic recorded thereon, execution of which, by a computing device, cause the computing device to perform operations for automatically integrating data across disparate information systems, the operations comprising:

developing a first set of mapping relations that map entities in a source structured data model to corresponding entities in a target structured data model;

developing a second set of mapping relations that map entities in the source structured data model and entities in the target structured data model to one or more shared contexts;

processing the first and second sets of mapping relations to generate new structured data model; and generating a web service comprising executable code that publishes the new structured data model to implement workflow between the source information system and the destination information system, the workflow comprising a sequence of information systems processed by traversing through entities of the new structured data model to resolve an operation of the web service.

10. The computer-readable storage device of claim 9, wherein the generating comprises:

executing source information to retrieve an instance;

translating the source instance into an instance that conforms to the new structured data model; and invoking a destination service to populate the instance conforming to the new structured data model.

11. The computer-readable storage device of claim 10, wherein the translating comprises:

invoking services corresponding to the shared context to mediate mismatches between entities in the source structured data model and entities in the target structured data model.

12. The computer-readable storage device of claim 11, wherein the invoking comprises:

mediating at least one of a structural mismatch, a syntactic mismatch, and a representational mismatch between entities in the source structured data model and entities in the target structured data model.

13. The computer-readable storage device of claim 9, the operations further comprising:

capturing the first set of mapping relations and the second set of mapping relations in one or more of (i) text format, (ii) HTML format, and (iii) spreadsheet format.

14. The computer-readable storage device of claim 9, the operations further comprising:

processing the first set of mapping relations and the second set of mapping relations to generate a schema.

15. The computer-readable storage device of claim 9, wherein the source structured data model, the target structured data model, and the new structured data model are ontologies.

16. The computer-readable storage device of claim 9, wherein the source information system and the target information system comprise any combination of a database and a web site.

* * * * *